US011957633B2

(12) United States Patent
Meng et al.

(10) Patent No.: US 11,957,633 B2
(45) Date of Patent: Apr. 16, 2024

(54) PATIENT TRANSPORT APPARATUS HAVING POWERED DRIVE SYSTEM UTILIZING COORDINATED USER INPUT DEVICES

(71) Applicant: Stryker Corporation, Kalamazoo, MI (US)

(72) Inventors: Fanqi Meng, Bentonville, AR (US); Jeffrey S. Dunfee, II, Kalamazoo, MI (US); Richard A. Derenne, Portage, MI (US); Anish Paul, Kalamazoo, MI (US)

(73) Assignee: Stryker Corporation, Kalamazoo, MI (US)

(*) Notice: Subject to any disclaimer, the term of this patent is extended or adjusted under 35 U.S.C. 154(b) by 1339 days.

(21) Appl. No.: 16/397,421

(22) Filed: Apr. 29, 2019

(65) Prior Publication Data

US 2019/0328594 A1 Oct. 31, 2019

Related U.S. Application Data

(60) Provisional application No. 62/664,296, filed on Apr. 30, 2018.

(51) Int. Cl.
*A61G 7/10* (2006.01)
*A61G 7/05* (2006.01)

(52) U.S. Cl.
CPC ......... *A61G 7/1048* (2013.01); *A61G 7/0528* (2016.11); *A61G 2203/14* (2013.01); *A61G 2203/16* (2013.01)

(58) Field of Classification Search
CPC .. A47G 7/0528; A47G 7/1048; A61G 7/0528; A61G 7/08; A61G 7/0514;
(Continued)

(56) References Cited

U.S. PATENT DOCUMENTS 4,339,013 A 7/1982 Weigt
6,330,926 B1 * 12/2001 Heimbrock .......... A61G 1/0225 280/43.17
(Continued)

FOREIGN PATENT DOCUMENTS

WO 2014187864 A1 11/2014

OTHER PUBLICATIONS

9to5 Google, "Nest's 3rd Generation Thermostat Gets Some New Views for Its Farsight Feature", https://9to5google.com/2016/06/14/nest-3rd-gen-thermostat-views-farsight/, Jun. 14, 2016, 4 pages.
(Continued)

*Primary Examiner* — Eric J Kurilla
*Assistant Examiner* — Amanda L Bailey
(74) *Attorney, Agent, or Firm* — Howard & Howard Attorneys PLLC

(57) ABSTRACT

A patient transport apparatus transports a patient over a floor surface. The patient transport apparatus includes a support structure and a drive wheel assembly having at least one drive wheel, a powered drive system coupled to the at least one drive wheel, and at least two user input devices. The apparatus also includes a controller coupled to the powered drive system and user input devices configured to determine which one of the user input devices is active and operable to cause the powered drive system to rotate the drive wheel and to maintain the other user input device as inactive, or passive.

8 Claims, 16 Drawing Sheets

(58) Field of Classification Search
CPC .... A61G 7/0509; A61G 7/0506; A61G 7/015; A61G 7/012; A61G 7/1048; A61G 7/1046; A61G 2203/30; A61G 2203/10; A61G 2203/14; A61G 2203/16; B62D 51/04; B62D 21/12; B62D 21/22
See application file for complete search history.

(56) References Cited

U.S. PATENT DOCUMENTS

| | | | | |
|---|---|---|---|---|
| 7,882,582 | B2 * | 2/2011 | Kappeler | A61G 7/08 5/510 |
| 8,392,049 | B2 * | 3/2013 | Goodwin | B62D 6/00 180/321 |
| 10,004,651 | B2 | 6/2018 | DeLuca et al. | |
| 10,045,893 | B2 | 8/2018 | Childs et al. | |
| 10,314,754 | B2 * | 6/2019 | Karwal | A61G 7/008 |
| 2003/0159861 | A1 | 8/2003 | Hopper et al. | |
| 2003/0183427 | A1 | 10/2003 | Tojo et al. | |
| 2004/0163175 | A1 | 8/2004 | Vogel et al. | |
| 2006/0102392 | A1 | 5/2006 | Johnson et al. | |
| 2007/0296600 | A1 * | 12/2007 | Dixon | A61G 7/0513 340/540 |
| 2009/0153370 | A1 | 6/2009 | Cooper et al. | |
| 2016/0089283 | A1 * | 3/2016 | DeLuca | A61G 7/08 180/413 |
| 2016/0367415 | A1 | 12/2016 | Hayes et al. | |
| 2017/0119607 | A1 | 5/2017 | Derenne et al. | |
| 2017/0281440 | A1 * | 10/2017 | Puvogel | A61G 7/0527 |
| 2018/0252535 | A1 | 9/2018 | Bhimavarapu et al. | |
| 2018/0289567 | A1 | 10/2018 | Childs et al. | |
| 2018/0369039 | A1 | 12/2018 | Bhimavarapu et al. | |

OTHER PUBLICATIONS

Into Robotics, “2 Simple Methods to Choose Motors for Wheel Drive Robots”, https://www.intorobotics.com/2-simple-methods-choose-motors-wheel-drive-robots/, Oct. 29, 2013, 10 pages.
Lamps Plus, “Deco Dome 17" High On-Off Accent Lamp”, https://www.lampsplus.com/products/deco-dome-17-inch-high-touch-on-off-accent-lamp_p6169.html, 2018, 7 pages.
Robo-Rats, “Robo-Rats Locomotion: Differential Drive”, https://groups.csail.mit.edu/drl/courses/cs54-2001s/diffdrive.html; Apr. 4, 2001, 2 pages.
U.S. Appl. No. 16/222,510, filed Dec. 17, 2018.

* cited by examiner

PATIENT TRANSPORT APPARATUS HAVING POWERED DRIVE SYSTEM UTILIZING COORDINATED USER INPUT DEVICES

RELATED APPLICATION

This application claims the benefit of and priority to U.S. Provisional Patent Application No. 62/664,296, filed on Apr. 30, 2018, the entirety of which is hereby incorporated herein by reference.

BACKGROUND

Patient transport systems facilitate care of patients in a health care setting. Patient transport systems comprise patient transport apparatuses such as, for example, hospital beds, stretchers, cots, tables, wheelchairs, and chairs, to move patients between locations. A conventional patient transport apparatus comprises a base, a patient support surface, and several support wheels, such as four swiveling caster wheels. Often, the patient transport apparatus has at least one drive wheel, in addition to the four caster wheels. The drive wheel is employed to assist a user in moving the patient transport apparatus in certain situations.

When the user wishes to employ the drive wheel to help move the patient transport apparatus, such as down long hallways, the user may interface with a user input device that causes the drive wheel to be driven by a powered drive system such that patient transport apparatus moves without the caregiver being required to exert a substantial, external force on the patient transport apparatus. However, depending upon the location of the patient transport apparatus, the user input device may be inaccessible by the user, or the accessibility of the user input device may be otherwise undesirable. For instance, when the user input device is located at a head end of the patient transport apparatus, and the head end is located against a wall, the user input device may be difficult to operate.

A patient transport apparatus designed to overcome one or more of the aforementioned challenges is desired.

DETAILED DESCRIPTION

Figure 1:
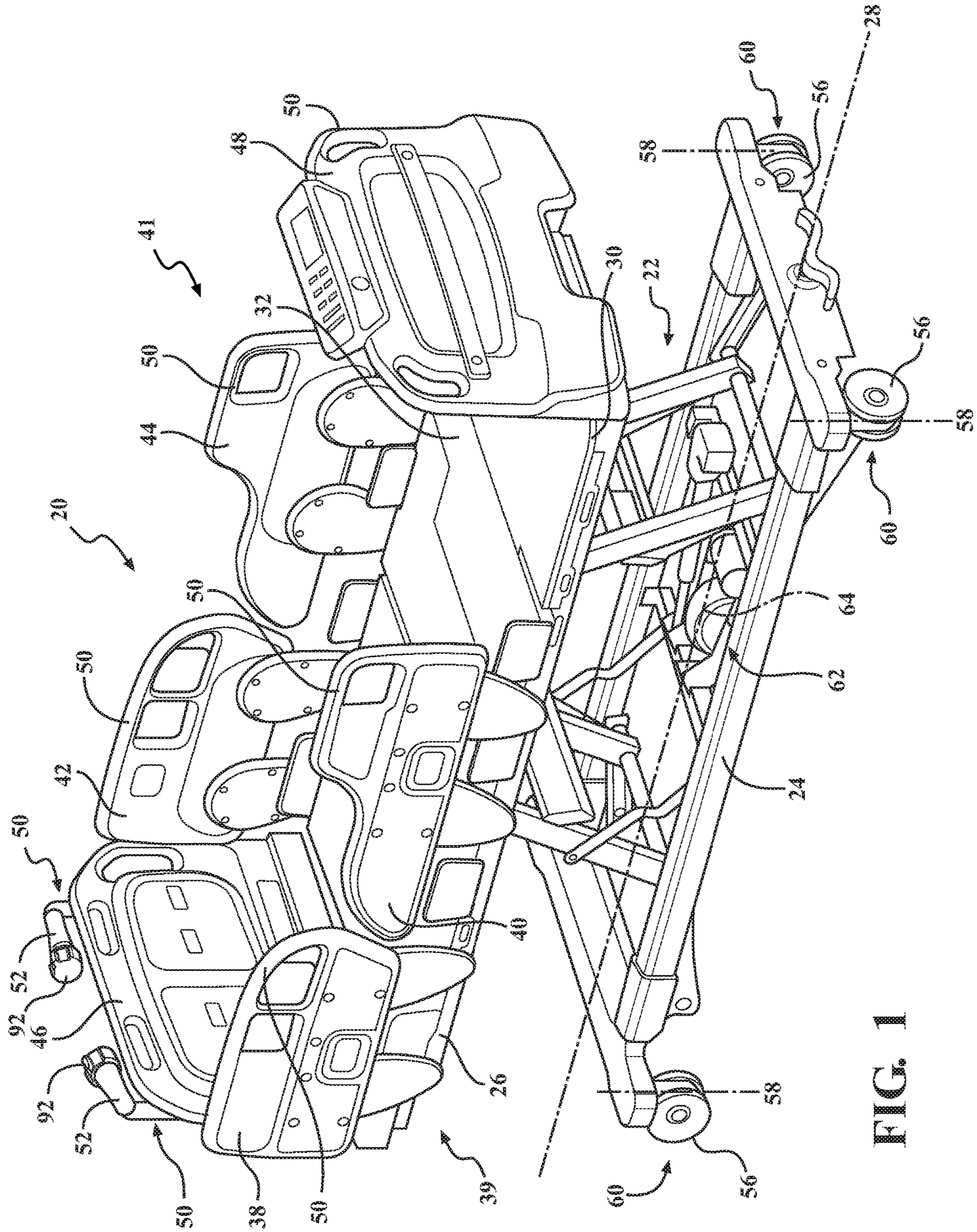
FIG. 1 is a perspective view of a patient transport apparatus.

Referring to FIG. 1, a patient transport system comprising a patient transport apparatus 20 is shown for supporting a patient in a health care setting. The patient transport apparatus 20 illustrated in FIG. 1 comprises a hospital bed. In other embodiments, however, the patient transport apparatus 20 may comprise a stretcher, a cot, a table, a wheelchair, and a chair, or similar apparatus, utilized in the care of a patient to transport the patient between locations.

A support structure 22 provides support for the patient. The support structure 22 illustrated in FIG. 1 comprises a base 24 and an intermediate frame 26. The base 24 defines a longitudinal axis 28 from a head end to a foot end. The intermediate frame 26 is spaced above the base 24. The support structure 22 also comprises a patient support deck 30 disposed on the intermediate frame 26. The patient support deck 30 comprises several sections, some of which articulate (e.g., pivot) relative to the intermediate frame 26, such as a fowler section, a seat section, a thigh section, and a foot section. The patient support deck 30 provides a patient support surface 32 upon which the patient is supported.

A mattress, although not shown, may be disposed on the patient support deck 30. The mattress comprises a secondary patient support surface upon which the patient is supported.

The base 24, intermediate frame 26, patient support deck 30, and patient support surface 32 each have a head end and a foot end corresponding to designated placement of the patient's head and feet on the patient transport apparatus 20. The construction of the support structure 22 may take on any known or conventional design, and is not limited to that specifically set forth above. In addition, the mattress may be omitted in certain embodiments, such that the patient rests directly on the patient support surface 32.

Side rails 38, 40, 42, 44 are supported by the base 24. A first side rail 38 is positioned at a right head end of the intermediate frame 26. A second side rail 40 is positioned at a right foot end of the intermediate frame 26. A third side rail 42 is positioned at a left head end of the intermediate frame 26. A fourth side rail 44 is positioned at a left foot end of the intermediate frame 26. The side rails 38, 40, 42, 44 may be connected to the intermediate frame 26 and/or the patient support deck 30. If the patient transport apparatus 20 is a stretcher, there may be fewer side rails. The side rails 38, 40, 42, 44 are movable between a raised position in which they block ingress and egress into and out of the patient transport apparatus 20 and a lowered position in which they are not an obstacle to such ingress and egress. The side rails 38, 40, 42, 44 may also be movable to one or more intermediate positions between the raised position and the lowered position. In still other configurations, the patient transport apparatus 20 may not comprise any side rails. The outer surfaces of the side rails 38 and 40 define a right side 39 of the patient transport apparatus 20 extending between the head end and the foot end of the patient transport apparatus 20, while the corresponding outer surfaces of the side rails 42, 44 define a left side 41 extending between the head end and the foot end of the patient transport apparatus 20.

A headboard 46 and a footboard 48 are coupled to the intermediate frame 26. In other embodiments, when the headboard 46 and footboard 48 are provided, the headboard 46 and footboard 48 may be coupled to other locations on the patient transport apparatus 20, such as the base 24. In still other embodiments, the patient transport apparatus 20 does not comprise the headboard 46 and/or the footboard 48.

User interfaces 50, such as handles, are shown integrated into the footboard 48 and side rails 38, 40, 42, 44 to facilitate movement of the patient transport apparatus 20 over floor surfaces. Additional user interfaces 50 may be integrated into the headboard 46 and/or other components of the patient transport apparatus 20. The user interfaces 50 are graspable by the user to manipulate the patient transport apparatus 20 for movement.

Other forms of the user interface 50 are also contemplated. The user interface may simply be a surface on the patient transport apparatus 20 upon which the user logically applies force to cause movement of the patient transport apparatus 20 in one or more directions, also referred to as a push location. This may comprise one or more surfaces on the intermediate frame 26 or base 24. This could also comprise one or more surfaces on or adjacent to the headboard 46, footboard 48, and/or side rails 38, 40, 42, 44.

In the embodiment shown, one set of user interfaces 50 comprises a pair of handles 52. The handles 52 are coupled to the intermediate frame 26 proximal to the head end of the intermediate frame 26 and on opposite sides of the intermediate frame 26 so that the user may grasp one of the handles 52 with one hand and the other of the handles 52 with the other hand. In another embodiment, the handles 52 are coupled to the headboard 46. In still other embodiments the handles 52 are coupled to another location permitting the user to grasp the handles 52. In yet further embodiments, an additional handle 52 or additional pairs of handles 52 may be included, such as, for example, one set proximal to the head end of the intermediate frame 26 and a second set proximal to the foot end of the intermediate frame 26.

Support wheels 56 are coupled to the base 24 to support the base 24 on a floor surface such as a hospital floor. The support wheels 56 allow the patient transport apparatus 20 to move in any direction along the floor surface by swiveling to assume a trailing orientation relative to a desired direction of movement. In the embodiment shown, the support wheels 56 comprise four support wheels each arranged in corners of the base 24. The support wheels 54 shown are caster wheels able to rotate and swivel about swivel axes 58 during transport. Each of the support wheels 56 forms part of a caster assembly 60. Each caster assembly 60 is mounted to the base 24. It should be understood that various configurations of the caster assemblies 60 are contemplated. In addition, in some embodiments, the support wheels 56 are not caster wheels and may be non-steerable, steerable, non-powered, powered, or combinations thereof. Additional support wheels 56 are also contemplated.

Figure 2:
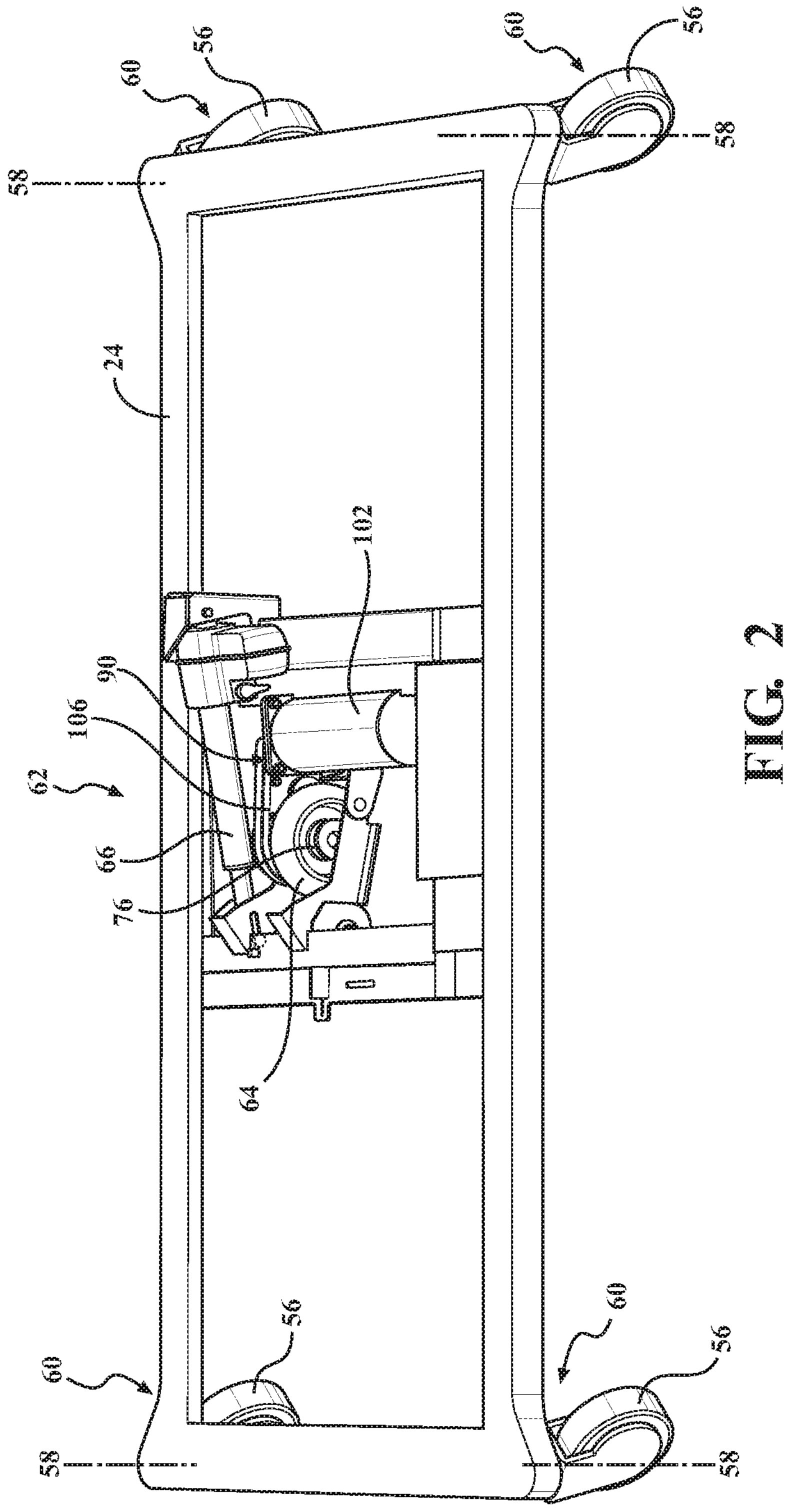
FIG. 2 is a perspective view of a drive wheel assembly of the patient transport apparatus coupled to a base of the patient transport apparatus.
Figure 3:
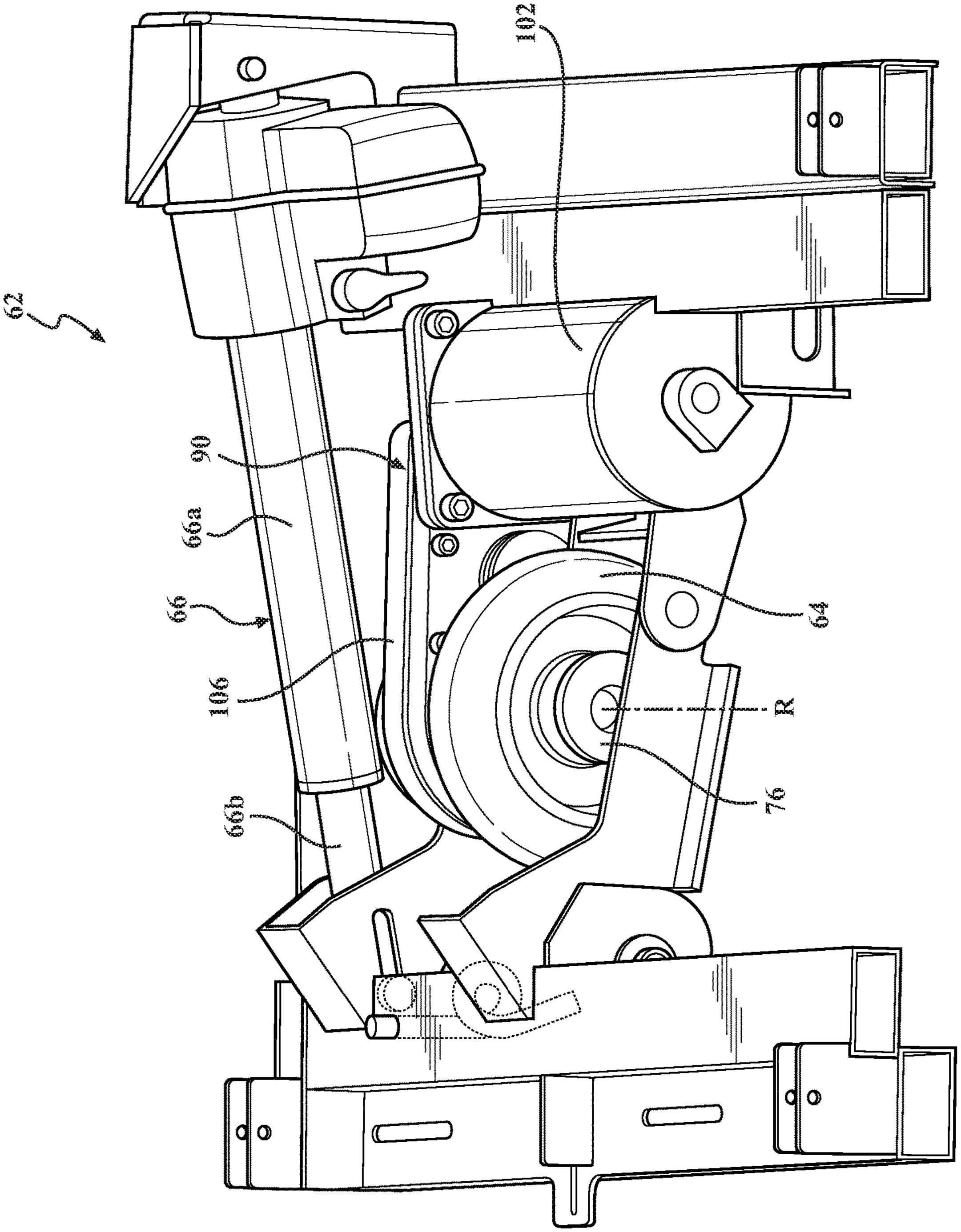
FIG. 3 is a perspective view of the drive wheel assembly comprising a drive wheel and a lift actuator.
Figure 4:
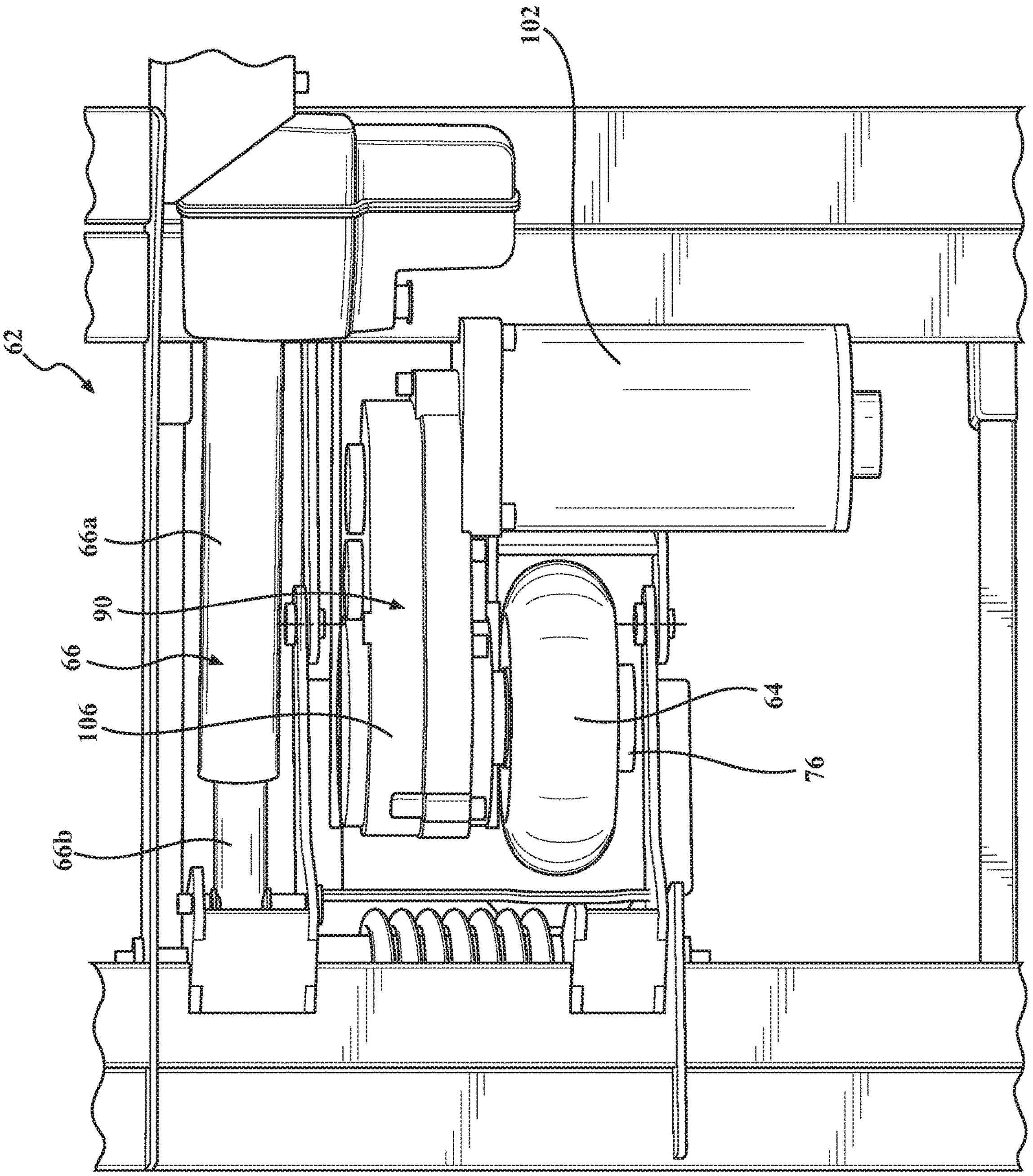
FIG. 4 is a plan view of the drive wheel assembly comprising the drive wheel and the lift actuator.
Figure 5:
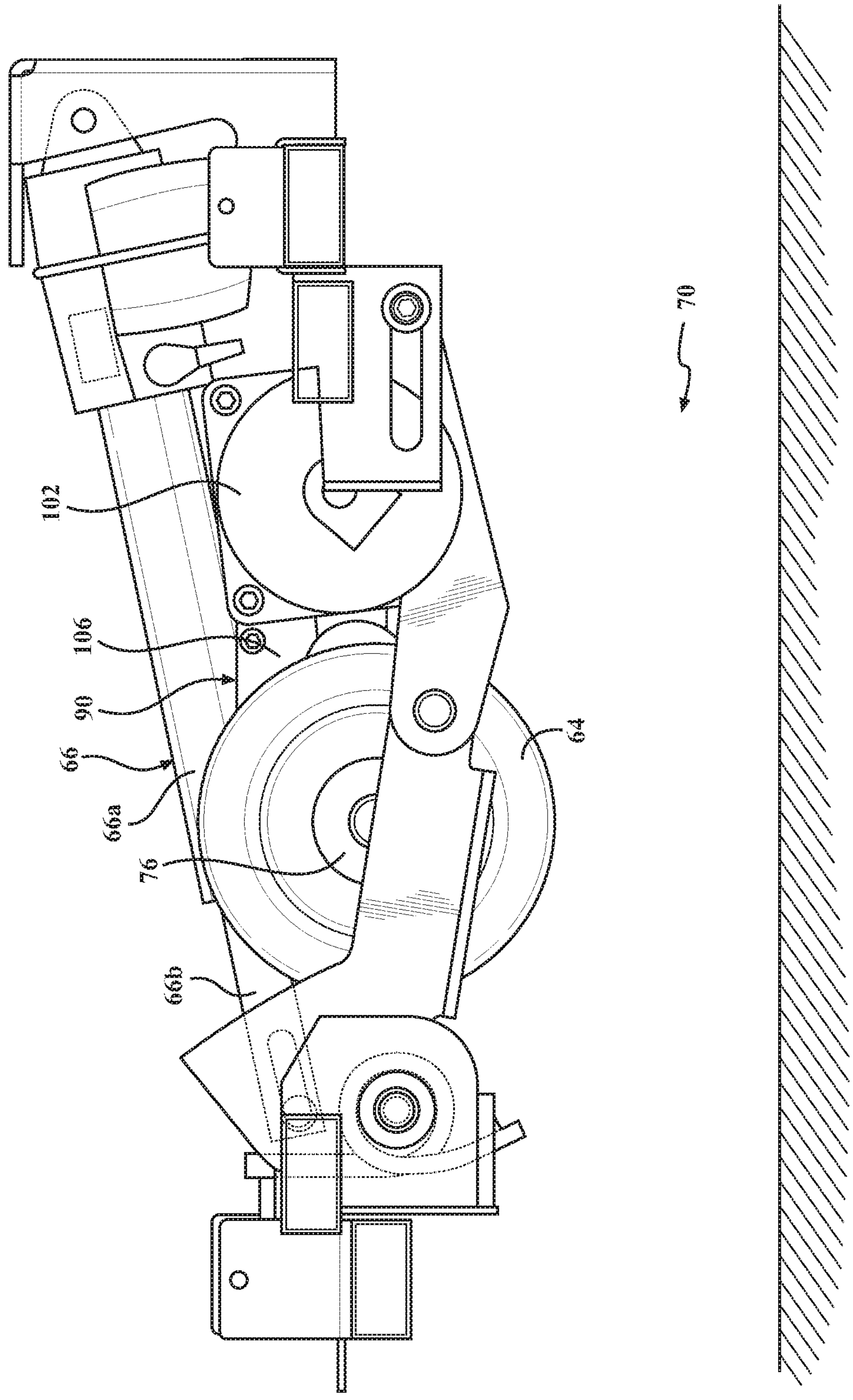
FIG. 5 is an elevational view of the drive wheel in a first position.
Figure 6:
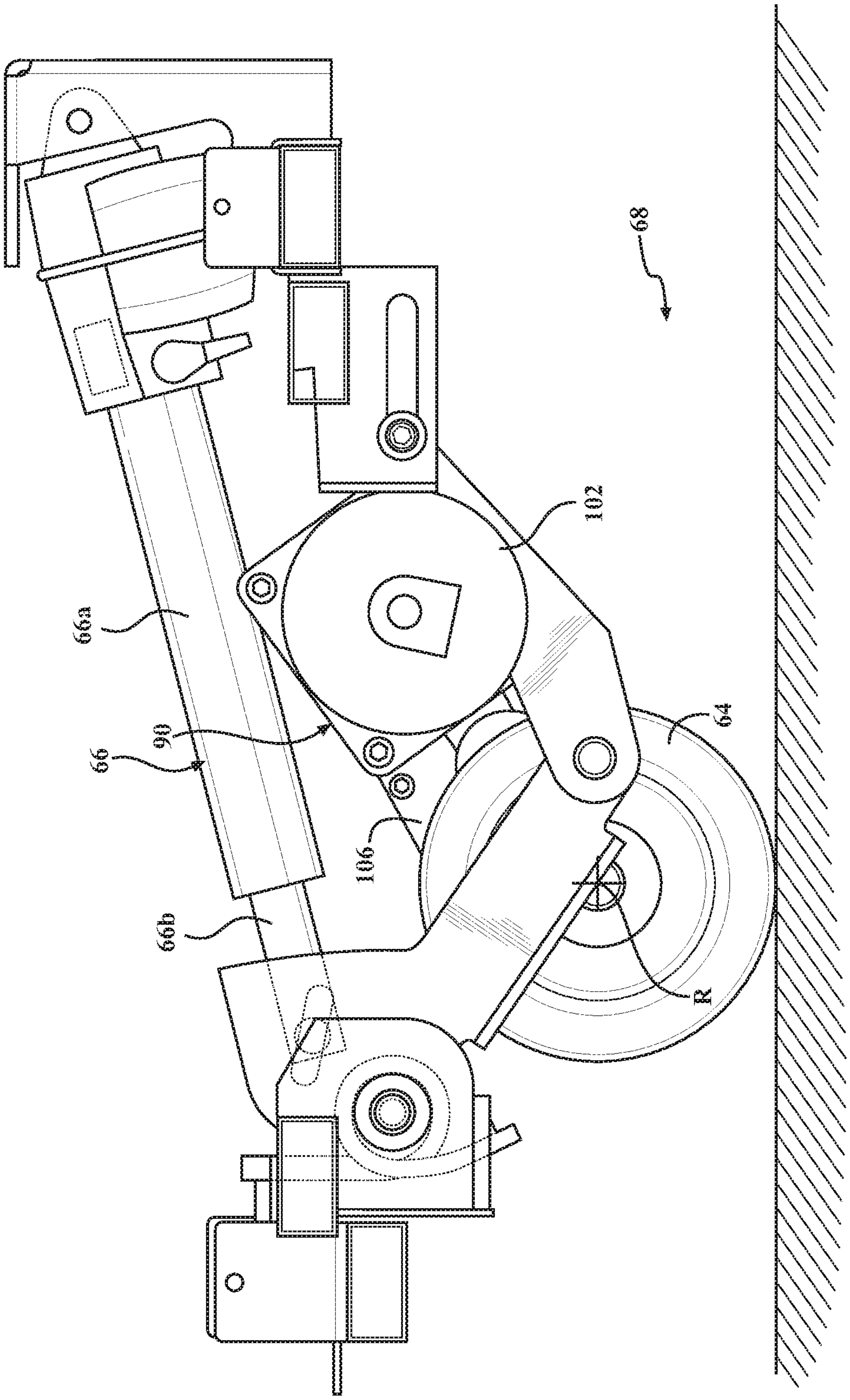
FIG. 6 is an elevational view of the drive wheel in a second position.

Referring to FIGS. 1 and 2, a drive wheel assembly 62 is coupled to the base 24. The drive wheel assembly 62 influences motion of the patient transport apparatus 20 during transportation over a floor surface. The drive wheel assembly 62 comprises a drive wheel 64.

In many embodiments, as shown in FIGS. 2-6, the drive wheel assembly 62 further comprises a lift actuator 66 operatively coupled to the drive wheel 64. The lift actuator 66 may be a linear actuator comprising a housing **66*a* and a drive rod 66*b* extending from the housing 66*a* (see FIG. 3). The drive rod 66*b* has a proximal end received in the housing 66*a* and a distal end spaced from the housing 66*a*. The distal end of the drive rod 66*b* is configured to be movable relative to the housing 66*a* to extend and retract an overall length of the lift actuator 66. The lift actuator 66 is operable to move the drive wheel 64 between a deployed position 68 engaging the floor surface (see FIG. 6) and a retracted position 70 spaced away from and out of contact with the floor surface (see FIG. 5). In some embodiments, the drive wheel assembly 60 comprises an additional drive wheel movable with the drive wheel 64 between the deployed position 68 and the retracted position 70 via the lift actuator 66**.

By deploying the drive wheel 64 on the floor surface in the deployed position 68, the patient transport apparatus 20 can be easily moved down long, straight hallways or around corners, owing to a non-swiveling nature of the drive wheel 64. When the drive wheel 64 is retracted in the retracted position 70, the patient transport apparatus 20 is subject to moving in an undesired direction due to uncontrollable swiveling of the support wheels 56. For instance, during movement down long, straight hallways, the patient transport apparatus 20 may be susceptible to "dog tracking," which refers to undesirable sideways movement of the patient transport apparatus 20. Additionally, when cornering, without the drive wheel 64 deployed, and with all of the support wheels 56 able to swivel, there is no wheel assisting with steering through the corner, unless one or more of the support wheels 56 are provided with steer lock capability and the steer lock is activated.

The drive wheel 64 may be arranged parallel to the longitudinal axis 28 of the base 24. Said differently, the drive wheel 64 rotates about a rotational axis R (see FIG. 6) oriented perpendicularly to the longitudinal axis 28 of the base 24 (albeit offset in some cases from the longitudinal axis 28). In the embodiment shown, the drive wheel 64 is incapable of swiveling about a swivel axis. In other embodiments, the drive wheel 64 may be capable of swiveling, but can be locked in a steer lock position in which the drive wheel 64 is locked to solely rotate about the rotational axis R oriented perpendicularly to the longitudinal axis 28. In still other embodiments, the drive wheel 64 may be able to freely swivel without any steer lock functionality.

The drive wheel 64 may be located to be deployed inside or outside a perimeter of the base 24 and/or inside or outside a support wheel perimeter defined by the swivel axes 58 of the support wheels 56. In some embodiments, such as those employing a single drive wheel 64, the drive wheel 64 may be located near a center of the support wheel perimeter, or offset from the center. In the embodiment shown, the drive wheel 64 has a diameter larger than a diameter of the support wheels 56. In other embodiments, the drive wheel 64 may have the same or a smaller diameter than the support wheels 56.

In the embodiment as also shown in FIGS. 2-6, the drive wheel assembly 62 comprises a powered drive system 90 operatively coupled to the drive wheel 64. The powered drive system 90 is configured to drive (e.g. rotate) the drive wheel 64 in response to the actuation of a user input device operable by the user. The powered drive system 90 comprises a motor 102. The powered drive system 90 further comprises a gear train 106 coupled to the motor 102 and an axle 76 of the drive wheel 64.

Figure 7:
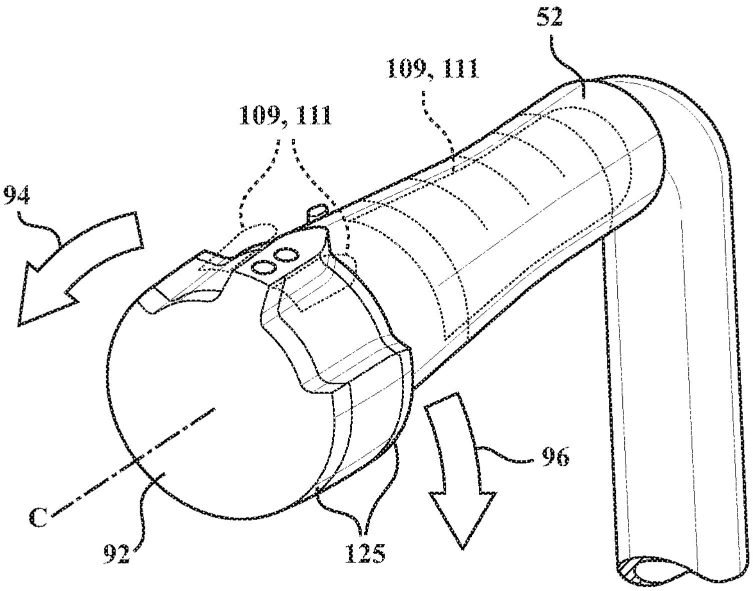
FIG. 7 is a perspective view of a handle and a throttle of the patient transport apparatus.
Figure 8:
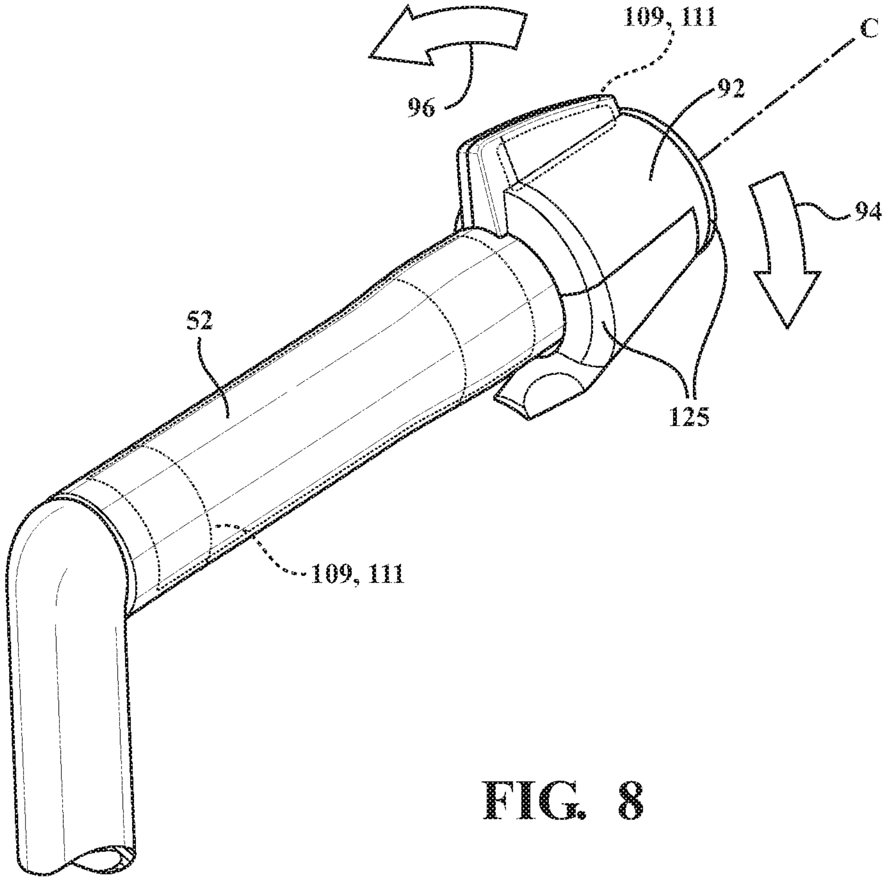
FIG. 8 is another perspective view of the handle and the throttle of the patient transport apparatus.

In some embodiments, at least two user input devices are provided to control operation of the drive wheel assembly 62. In the embodiment shown in FIGS. 1, 7, and 8, the at least two user input devices comprise a pair of throttles 92 (see FIG. 1), with one of the pair of throttles 92 coupled to a respective one of the pair of handles 52. FIGS. 7 and 8 illustrate one of the pair of handles 52 including a respective one of the pair of throttles 92. The throttle 92 and its respective handle 52 collectively form a throttle assembly. In FIGS. 7 and 8, the throttle 92 is illustrated in a neutral throttle position, or first throttle position. The throttle 92 is movable in a first direction 94 (for forward driving) relative to the neutral throttle position and a second direction 96 (for backward driving) relative to the neutral throttle position opposite the first direction 94. The throttle 92 is movable (e.g., via rotation) to various second throttle positions (distinct from the neutral or first throttle position and each respective other second throttle position), also referred to as driving throttle positions, to cause movement of the patient transport apparatus 20 at various speeds in the first direction 94 or the second direction 96. The throttles 92 comprise one or more devices that sense or otherwise detect the throttle position (either the first or various second throttle positions described above) relative to its corresponding handle 52, e.g. a position sensor such as an encoder, a potentiometer, etc., and sends a signal to a controller 126 corresponding to the detected, relative throttle position. The controller 126 responds to the detected throttle position by powering the powered drive system 90 to drive the drive wheel 64 accordingly, e.g., the angle of rotation of the throttle 92 may be proportional to the drive speed. The location of the throttle 92 relative to its respective handle 52 permits the user to simultaneously grasp the handle 52 and rotate the throttle 92 about a center axis C.

The exemplary drive wheel assembly 62 and throttles 92, as described herein, are also described in U.S. patent application Ser. No. 16/222,510, entitled "Patient Transport Apparatus with Controlled Auxiliary Wheel Speed," filed on Dec. 17, 2018, the disclosure of which is hereby incorporated by reference in its entirety. It should be appreciated that other configurations of the drive wheel assembly 62 and throttles 92 are also contemplated. Furthermore, user input devices, other than the throttles 92, may also be employed. Moreover, more than two user input devices (e.g., more than two throttles 92) may be provided to allow the user to drive the patient transport apparatus 20 from various locations about the patient transport apparatus 20. In some of the embodiments described herein, the throttles 92 are arranged with respect to the patient transport apparatus 20 such that users are able to access at least one of the throttles 92 from either side 39, 41 of the patient transport apparatus 20, which may be useful, for example, when the headboard 26 is located adjacent a wall and the user is otherwise unable to stand at the head end of the patient transport apparatus 20. This also may be useful when the user is required to transport a patient with equipment, such as with an IV pole and cart (e.g., an IV caddy) when the cart has to be pulled alongside the patient transport apparatus 20. In this case, the user can stand on one of the sides 39, 41 while pulling the cart and driving the patient transport apparatus 20.

Figure 9:
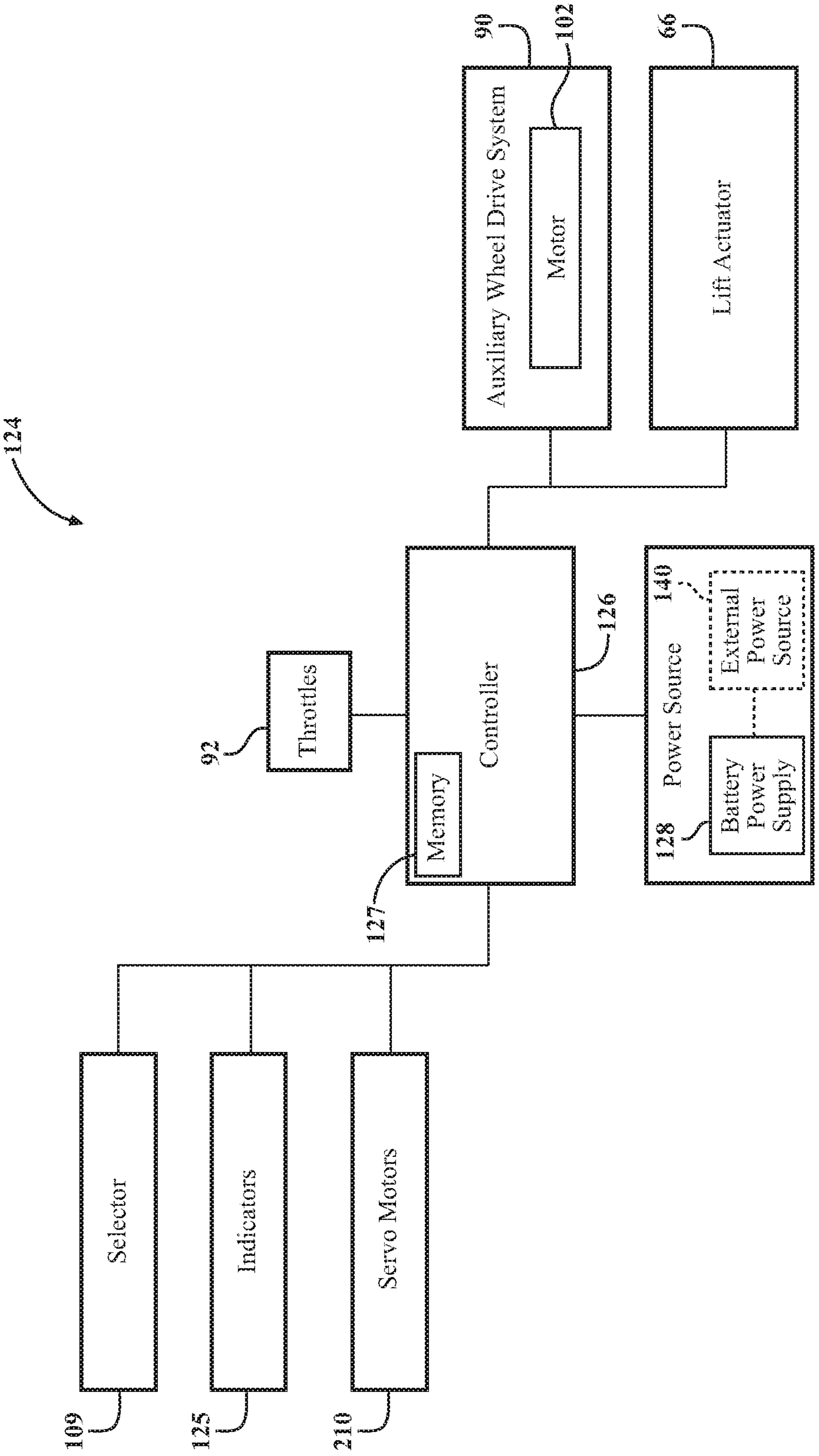
FIG. 9 is a schematic view of a control system of the patient transport apparatus.

FIG. 9 illustrates a control system 124 of the patient transport apparatus 20. The control system 124 comprises the controller 126 coupled to the throttles 92, the lift actuator 66, and the powered drive system 90. The controller 126 is also coupled to a selector 109, indicators 125, and servo motors 210 described further below. The controller 126 is configured to transmit and/or receive input/output signals to/from the various components shown in FIG. 9. The controller 126 may communicate with these components via wired or wireless connections to control the various components shown, to control other components not represented in FIG. 9, and/or to otherwise carry out the functions described herein.

The controller 126 comprises one or more microprocessors for processing instructions or for processing algorithms stored in memory 127 to carry out the functions described herein. Additionally or alternatively, the controller 126 may comprise one or more microcontrollers, subcontrollers, field programmable gate arrays, systems on a chip, discrete circuitry, and/or other suitable hardware, software, or firmware that is capable of carrying out the functions described herein. The controller 126 may be carried on-board the patient transport apparatus 20, or may be remotely located. In one embodiment, the controller 126 is mounted to the base 24, but can be mounted in any suitable location. Memory 127 may be any memory suitable for storage of data and computer-readable instructions. For example, the memory 127 may be a local memory, an external memory, or a cloud-based memory embodied as random access memory (RAM), non-volatile RAM (NVRAM), flash memory, or any other suitable form of memory. Power to the various components of the patient transport apparatus 20 may be provided by a battery power supply 128 and/or external power source 140.

In one embodiment, the controller 126 comprises an internal clock to keep track of time. In one embodiment, the internal clock is a microcontroller clock. The microcontroller clock may comprise a crystal resonator; a ceramic resonator; a resistor, capacitor (RC) oscillator; or a silicon oscillator. Examples of other internal clocks other than those disclosed herein are fully contemplated. The internal clock may be implemented in hardware, software, or both. In some embodiments, the memory 127, microprocessors, and microcontroller clock cooperate to send signals to and operate the various components shown in FIG. 9 to meet predetermined timing parameters. These predetermined timing parameters are discussed in more detail below.

In some embodiments, the controller 126 is configured to select one of at least two user input devices as the active or dominant user input device, while keeping the other user input device(s) inactive (e.g., by deactivating the other user input device(s)). The selection of a dominant user input device, as will be described in further detail below, can either be selected by which user input device is used first (i.e., passive selection) or through a mode selector (i.e, active selection). In addition, the process of coordinating use of multiple user input devices by selecting the active user input device will be described below with respect to the throttles 92, but it should be appreciated that it applies equally to other suitable forms of user input devices.

Figure 10:
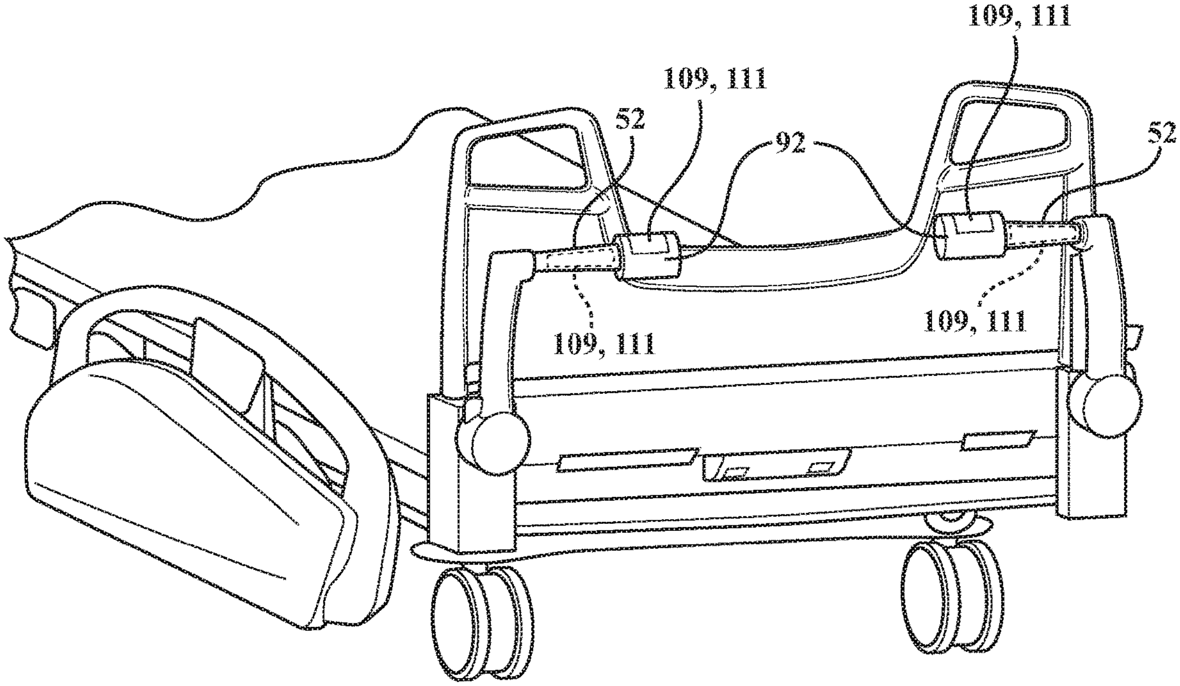
FIG. 10 is a perspective view of a pair of handles and throttles of one embodiment of the patient transport apparatus.
Figure 11:
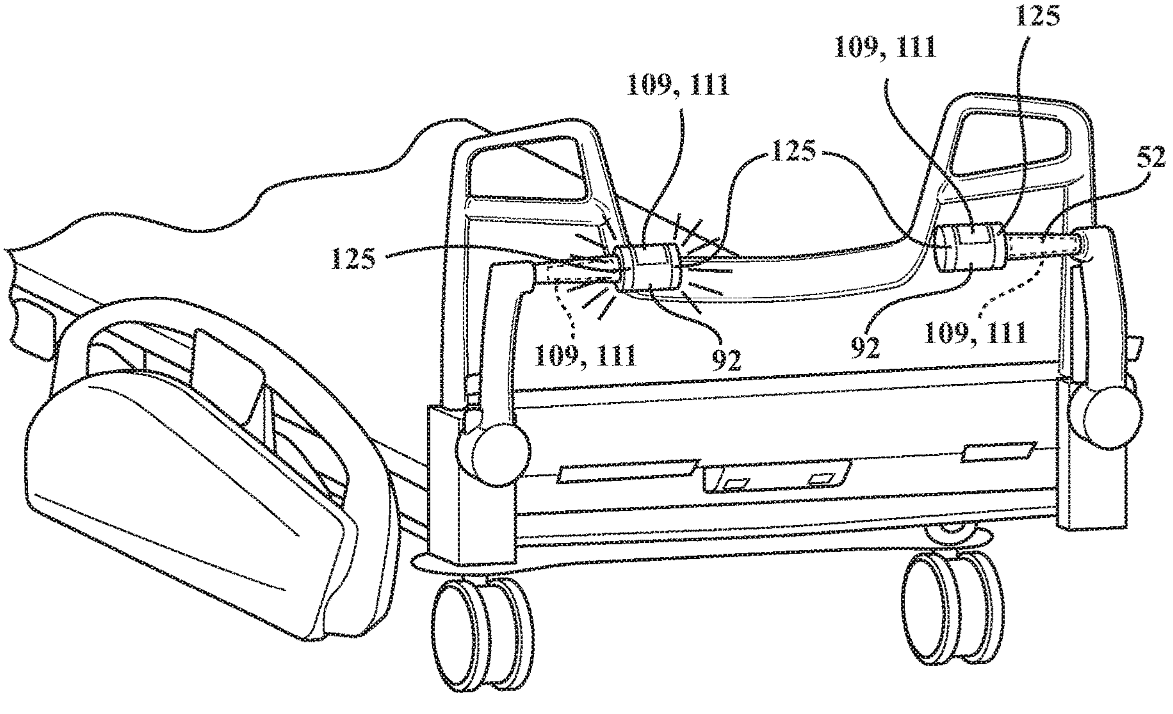
FIG. 11 is a perspective view of a pair of handles and throttles of another embodiment of the patient transport apparatus.

Referring to FIGS. 10 and 11, the controller 126 is configured to select one of the throttles 92 as the active throttle 92, or dominant throttle 92, while keeping the other throttle(s) 92 inactive (e.g., by deactivating the other throttle (s)). The selector 109 detects selection of the active throttle 92 by the user based upon user input. The selector 109 may comprise one or more sensors, such as one or more touch sensors 111 (e.g., capacitive sensors), one or more proximity sensors (not shown), one or more switches 113, and the like. The selector 109 operates to detect selection of the active throttle 92, such as by (i) sensing the user's contact with one of the throttles 92 via the one or more touch sensors 111, (ii) sensing the user being in proximity to the throttle 92 via one or more proximity sensors, (iii) user actuation of the one or more switches 113, and/or (iv) other methods of detecting user selection of the active throttle 92. Upon selection of the active throttle 92 by the user, the controller 126 operates the powered drive system 90 to rotate the drive wheel 64 in response to operation of the active throttle 92. Still further, the controller 126 is also configured to lock out the non-selected, inactive throttle 92. Locking out the inactive throttle 92 may comprise the controller 126 being programmed to ignore any rotation of the inactive throttle 92 such that the inactive throttle is inoperable and unable to control the powered drive system 90 to rotate the drive wheel 64. In other embodiments, the inactive throttle 92 may be mechanically locked such that it's unable to be rotated. Other methods of locking the inactive throttle 92 are also possible.

In the embodiment shown in FIGS. 10 and 11, one of the touch sensors 111 is coupled to each one of the respective throttles 92 and/or the handles 52 (see hidden lines). Initially, if none of the touch sensors 111 have detected user contact for a predetermined period of time, then both of the throttles 92 are inactive. To initiate a driving session, the controller 126 awaits a signal from one of the touch sensors 111 that indicates the user's desire for powered drive assist. The first touch sensor 111 that is selected, typically via user contact, provides a signal to the controller 126 so that the controller 126 can thereby activate the associated throttle 92 as being the active or dominant throttle 92, while the other throttle 92 remains inactive. The user contact of the touch sensor 111 may need to be continuous user contact to maintain the active throttle 92 as active, or the user contact may be a single touch contact in an on/off type manner, with the active throttle 92 being active until the touch sensor 111 is contacted again, or until the predetermined period of time has elapsed, after which time both of the throttles 92 are inactive.

After selection via user contact on the touch sensor 111, the user may then engage the dominant throttle 92 by rotating the throttle 92 in the first direction 94 or second direction 96 to a driving throttle position, thereby sending a signal to the controller 126 to operate the powered drive system 90. The powered drive system 90 rotates the drive wheel 64 in response to operation of the active throttle 92 to propel the patent transport apparatus 20 forward or backward. Such a driving session may stop once the controller 126 determines that the user has returned the active throttle 92 to the neutral position and disengaged the touch sensor 111 (typically by releasing contact from the touch sensor 111), via a signal or lack of signal from the touch sensor 111 that was initially contacted by the user, or by the lapse of a predetermined amount of time, or by another event according to the logic included within the controller 126. A new drive session begins when one of the touch sensors 111 is selected in the same manner as described above.

Referring now to FIG. 11, one or more indicators 125 may be coupled to or otherwise associated with each one of the throttles 92 to indicate which throttle 92 is active and/or which is inactive (e.g., to differentiate between the active user input device and inactive user input device(s)). The indicators 125 may comprise one or more visual indicators (displays, lights, LEDs, touchscreens, etc.), one or more audible indicators (speakers, etc.), and/or one or more tactile indicators (e.g., piezoelectric devices, etc.). The indicators 125 shown in FIG. 11 comprise a pair of visual indicators respectively coupled to each one of the throttles 92 adjacent to the touch sensors 111 on the throttles 92. The indicators 125 may be located at any suitable location on the patient transport apparatus 20 to identify which of the throttles 92 are active/inactive. The visual indicators shown are configured to illuminate in coordination with the selection of one of the throttles 92 as the active throttle 92. Stated another way, the visual indicator that is coupled to the active throttle 92 is illuminated when the active throttle 92 is selected via user contact of the corresponding touch sensor 111. In this way, the user has a visual confirmation as to which of the throttles 92 is the active throttle 92. The visual indicators may comprise one or more light emitting diodes or LEDs, such as multi-colored LEDs. In other cases, the visual indicators on each throttle 92 may both emit light, but of different colors. For example, the visual indicators on the active throttle 92 may emit green or blue light to indicate being the active throttle 92 and the visual indicators on the inactive throttle may emit red or orange light to indicate being inactive, or vice versa. The visual indicators on both throttles 92 may emit red or orange light to indicate both are inactive, or conversely emit red or orange light to indicate both are active. Still further combinations of lighting schemes or visual indications of the active/inactive throttles 92 are also contemplated, such as graphical displays, displaying text, flashing light schemes, and the like.

Figure 12:
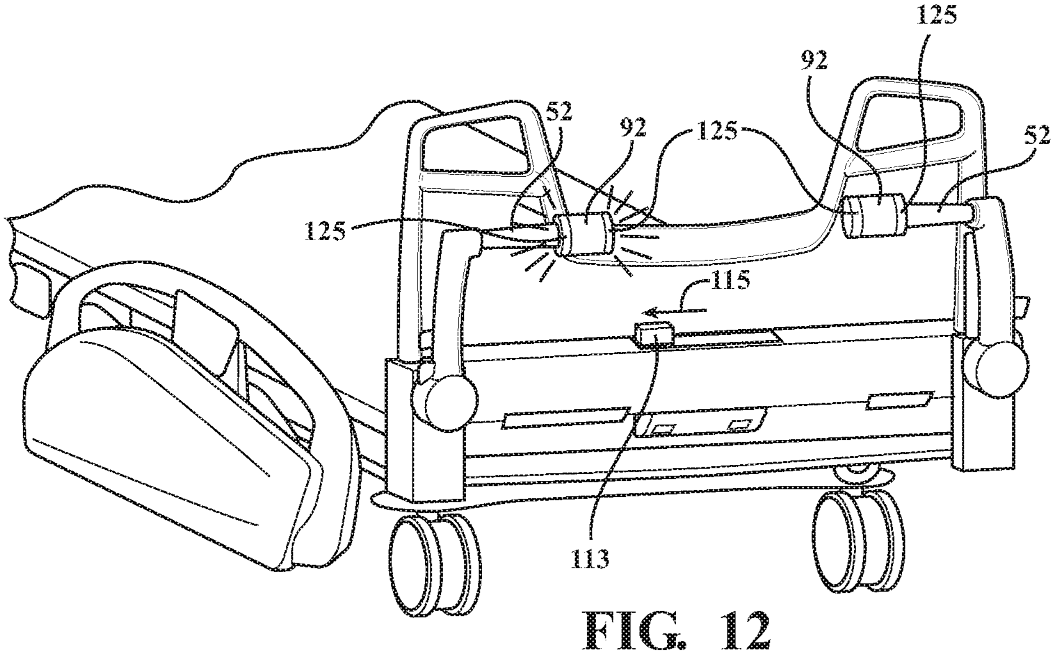
FIG. 12 is a perspective view of a pair of handles and throttles of another embodiment of the patient transport apparatus.

Referring to FIG. 12, in another embodiment, the selector 109 comprises the switch 113. The switch 113 may be coupled to any portion of the patient transport apparatus 20 in proximity to the pair of handles 52, such as on the intermediate frame 26. In the embodiment shown, the switch 113 comprises a slider that is slidable in a first direction (such as leftward as indicated by arrow 115 from a neutral position) to select the throttle 92 on the left handle 52 as the active throttle 92. When the visual indicator associated with the left handle 52 is included, as also shown in FIG. 12, it illuminates to visually confirm the selection of the left throttle 92 as the active throttle by virtue of the sliding of the switch 113 from the neutral position to the leftmost position. The sliding of the switch 113 in a second direction opposite the first direction (i.e., rightward or opposite the arrow 115 as in FIG. 12) to a rightmost position, conversely, would act to change the selection of the active throttle 92 to the throttle 92 located on the right handle (i.e., corresponding to the handle 52 including the additional visual indicator not illuminated in FIG. 12). Other forms of switches 113 are contemplated, including toggle switches, push buttons, touch screens, dials, and the like to select the active throttle 92 between the respective pair of throttles 92 or among more than two throttles 92.

Figure 13:
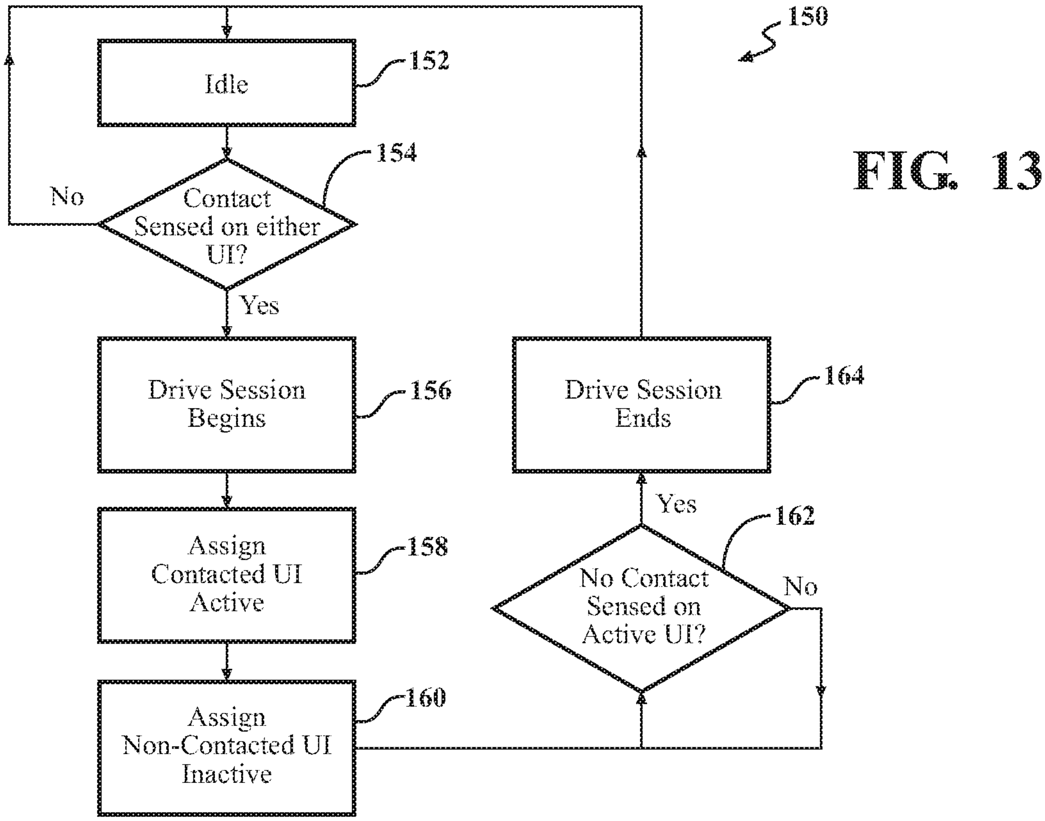
FIG. 13 is a logic flow diagram for initiating operating the patient transport apparatus of FIGS. 10-12.

Logic 150 for operating the patient transport apparatus 20 to select one of the user input devices (e.g., throttles 92) as the active user input device is shown in FIG. 13.

In Step 152, the patient transport apparatus 20 is idle (i.e., not being driven). When idle, the controller 126 commands the indicators 125, such as the visual indicators, to indicate that all of the user input devices are inactive.

In Step 154, the controller 126 determines whether the user has selected one of the user input devices to become active, such as by sensing that the user has contacted one of the touch sensors 111 or that the user has actuated the switch 113 rightward or leftward as in FIG. 12. If no, the controller 126 reverts back to Step 152. If yes, the controller 126 proceeds to Step 156.

In Step 156, a drive session begins. More specifically, a signal from the selector 109 is sent to the controller 126 so that the controller 126 can activate (i.e., assign) the associated user input device as being the active or dominant user input device (Step 158) and/or keep the other user input device inactive (Step 160).

In Step 162, the controller 126, through the selector 109, determines whether the active user input device has become inactive, such as by detecting that the user has ceased contact with the touch sensor 111 or by detecting that the switch 113 has been moved back to the neutral position. If no, the controller 126 reverts back to Step 160. If yes, the controller 126 proceeds to Step 164, where the drive session ends. The controller 126 then reverts back to the idle state of Step 152 in advance of the next drive session.

In some embodiments, at least two user input devices may be linked in a coordinated manner such that movement of one of the at least two user input devices by a user results in like movement of the other linked user input device(s). In this way, the user can utilize any one of the user input devices to propel the patient transport apparatus 20 in a forward or backward direction without concern that another user could inadvertently actuate any of the other user input devices in an adverse manner. Such linkage of user input devices will be described below with respect to the throttles 92, but it should be appreciated that it applies equally to other suitable forms of user input devices.

Figure 14A:
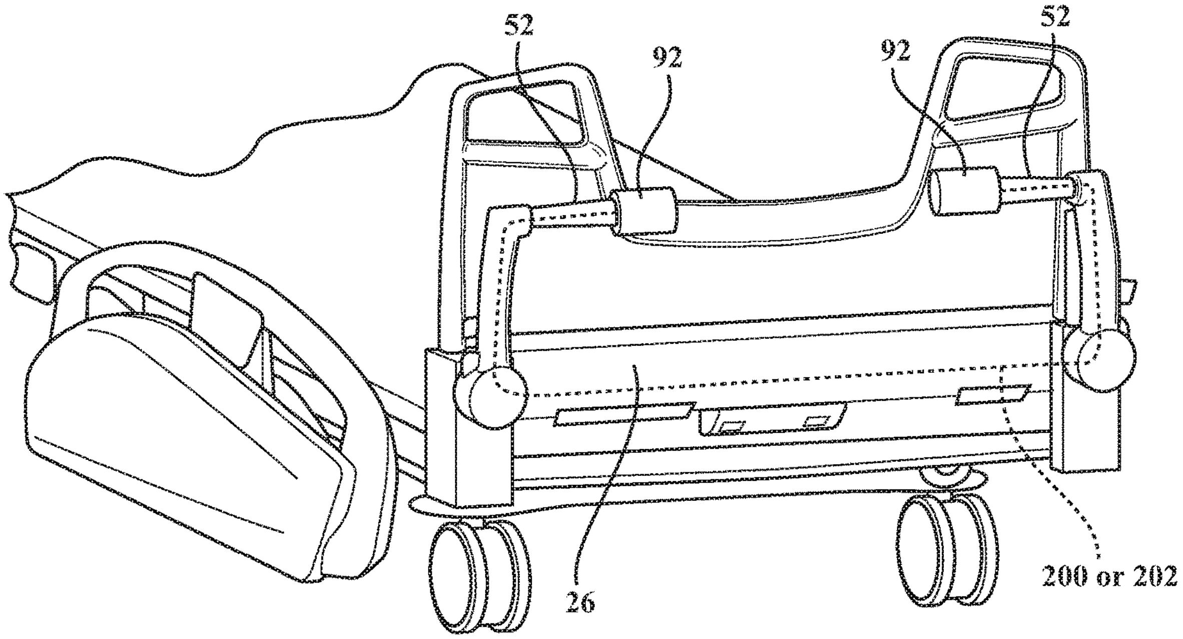
FIG. 14A is a perspective view of a pair of handles and throttles of another embodiment of the patient transport apparatus.
Figure 14B:
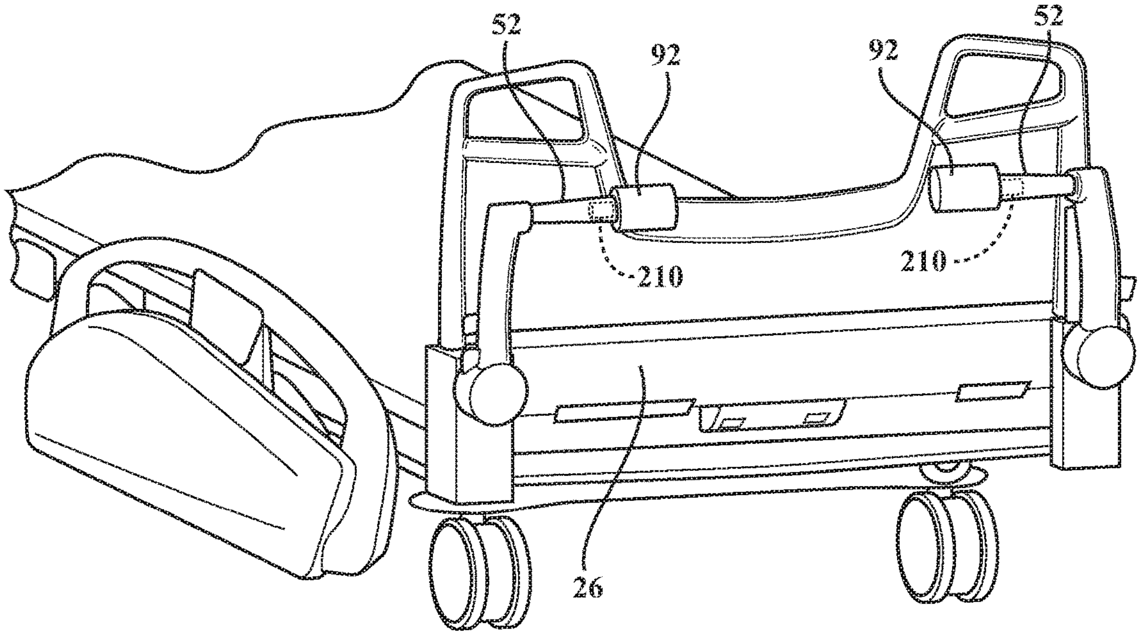
FIG. 14B is a perspective view of a pair of handles and throttles of another embodiment of the patient transport apparatus.
Figure 14C:
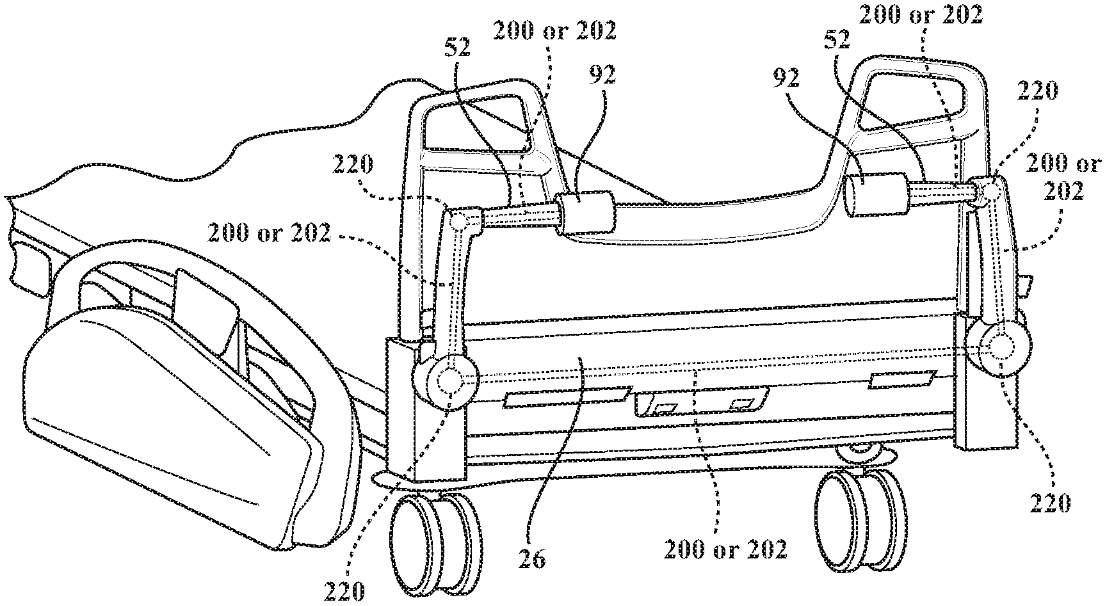
FIG. 14C is a perspective view of a pair of handles and throttles of another embodiment of the patient transport apparatus.
Figure 14D:
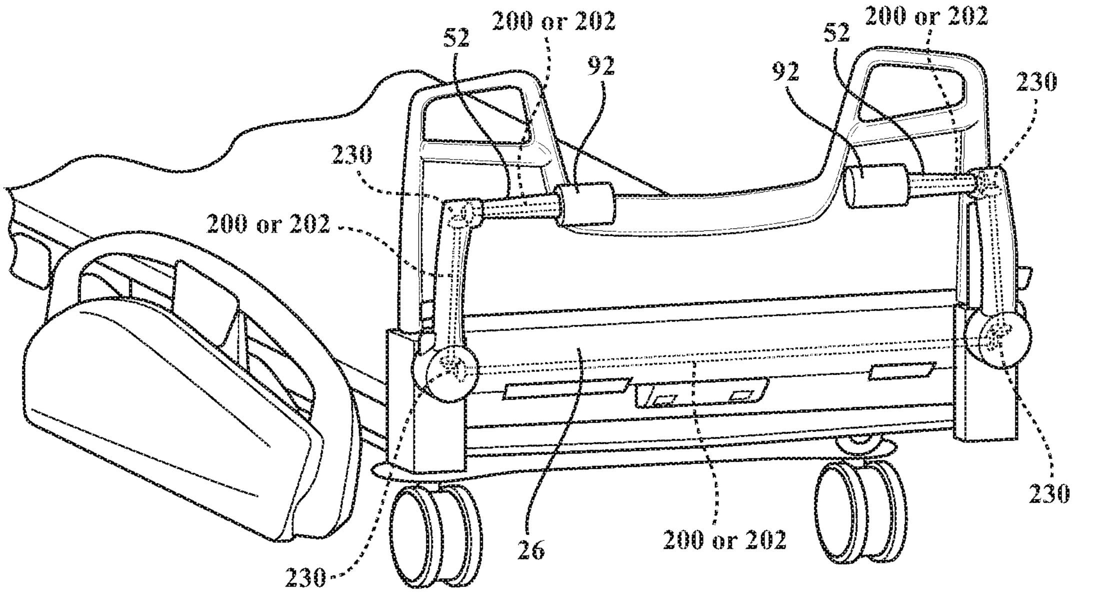
FIG. 14D is a perspective view of a pair of handles and throttles of another embodiment of the patient transport apparatus.
Figure 15:
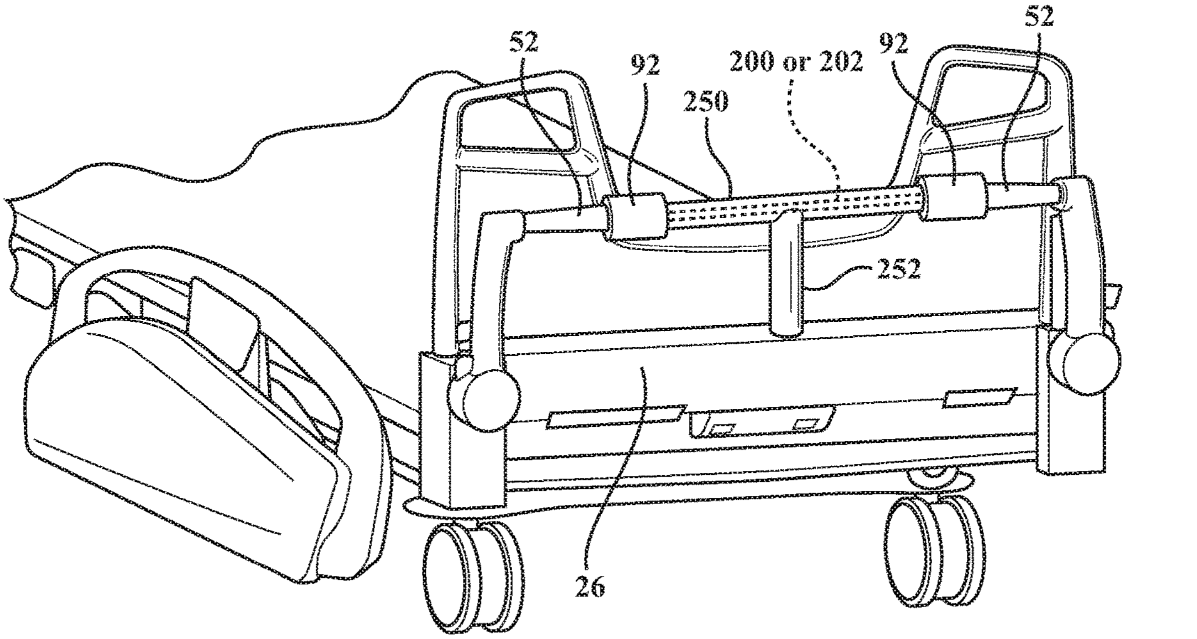
FIG. 15 is a perspective view of a pair of handles and throttles of another embodiment of the patient transport apparatus.
Figure 16:
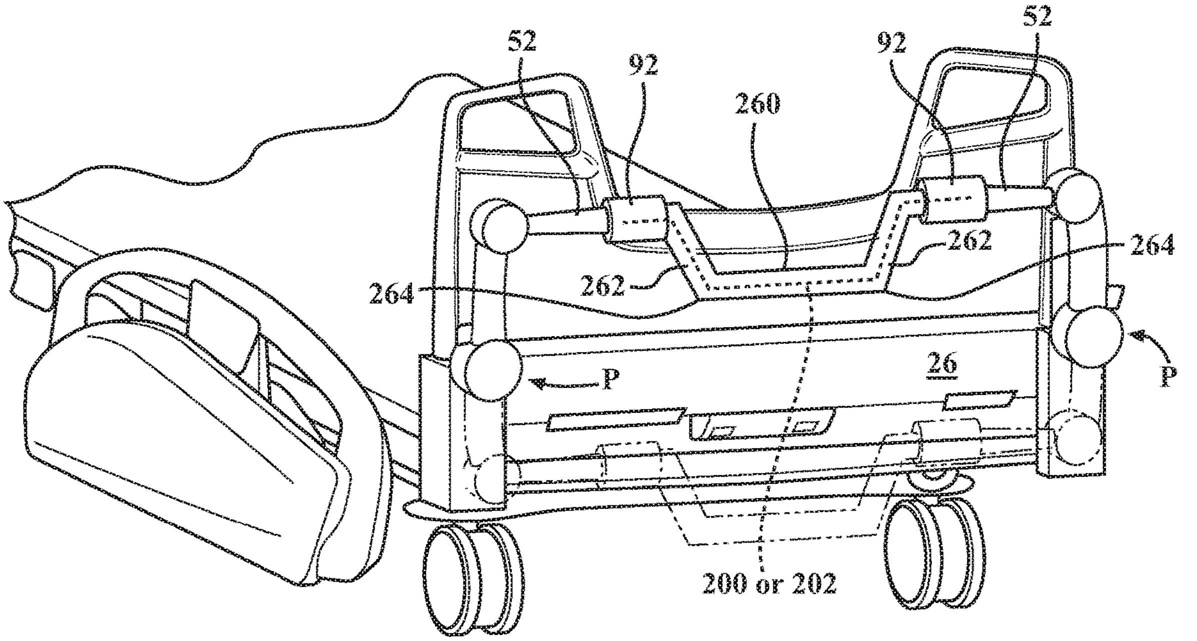
FIG. 16 is a perspective view of a pair of handles and throttles of another embodiment of the patient transport apparatus.

Referring to FIGS. 14-16 below, at least two of the throttles 92 of the patient transport apparatus 20 may be linked in a cooperative manner such that the rotational movement of one of the throttles 92 by a user results in automatic and like rotational movement of at least one additional linked throttle 92 (in some cases, two or more throttles 92 may be linked together). In this way, the user can utilize any one of the throttles 92 to propel the patient transport apparatus 20 in a forward or backward direction without concern that another user could inadvertently actuate any of the other throttles 92.

Referring first to FIGS. 14A-14D, the linking of a respective pair of throttles 92 is accomplished through the use of a linkage, such as one or more mechanical cables 200, one or more shafts 202 (such as a flexible shaft or flex shaft), cooperating servo motors 210, and the like, that are operatively coupled to and/or extend between each of the pair of throttles 92. Other forms of linkage are also contemplated that mechanically link the throttles 92 or other user input devices.

In FIG. 14A, a single mechanical cable 200 or shaft 202 is utilized. As shown in FIG. 14A, one end of the mechanical cable 200 or shaft 202 is coupled, such as mechanically coupled, to a first one of the throttles 92 (i.e., the leftmost throttle 92 illustrated in FIG. 14A), while the second, or opposite end, is coupled to a second one of the throttles 92 (i.e., the rightmost throttle 92 illustrated in FIG. 14A). The cable 200 and shaft 202 extends from the leftmost throttle 92, through the horizontally and vertically extending portions of the leftmost handle 52, though a portion of the intermediate frame 26 on which each of the handles 52 are affixed, through the vertically and horizontally extending portions of the rightmost handle 52, and to the rightmost throttle 92.

In FIG. 14A, the rotation of one of the throttles 92 in the first direction 94 or second direction 96 by a user from the neutral position to the driving throttle position causes the coupled cable 200 or shaft 202 to move in response. The movement of the coupled cable 200 or shaft 202 in turn causes the other one of the throttles 92 to rotate in a coordinated manner in either the first or second direction to the same driving throttle position.

In FIG. 14B, as opposed to utilizing a single mechanical cable 200 or shaft 202 as in FIG. 14A, one or more servo motors 210 are respectively coupled to the rightmost and leftmost throttles 92 and to the controller 126. Accordingly, the rotation of one of the throttles 92 in the first direction 94 or second direction 96 by a user from the neutral position to the driving throttle position is sensed by the potentiometer (or other sensor) of the throttle 92 being rotated, which sends a corresponding signal to the controller 126. The controller 126 then is able to detect which throttle 92 is being moved, via the change in signal from the potentiometer or other sensor, and can then command the servo motor 210 connected to the other throttle 92 to rotate the other throttle 92 in a like manner, i.e., to rotate the other throttle 92 in a coordinated manner in either the first or second direction to the same driving throttle position.

Referring next to FIG. 14C, in another embodiment, as opposed to utilizing a single mechanical cable 200 or shaft 202, multiple cables 200 or shafts 202 are utilized. In addition, u-joints 220 are positioned between each respective pair of the cables 200 or shafts 202 at locations extending between the handles 52 wherein the direction of the respective lengths of the cables 200 or shafts 202 would transition from one direction to another direction (typically horizontally extending to vertically extending or vice versa). For example, as shown in FIG. 14C, u-joints 220 are included within each respective handle 52 at locations wherein the handle 52 transitions from horizontal (corresponding to the portion of the handle 52 that the user grasps when engaging the throttle 92 or otherwise moving the patient transport apparatus 20) to vertical (corresponding to the length of the handle 52 that extends to and is coupled to the intermediate frame 26). In addition, u-joints 220 are also included at locations corresponding to where the base of the handles 52 are coupled to the intermediate frame 26 to allow the transition of the cable 200 or shaft 202 to extend in a generally horizontal direction across the intermediate frame 26 between the handles 52.

Accordingly, in FIG. 14C, the rotation of one of the throttles 92 in the first direction 94 or second direction 96 by a user from the neutral position to the driving throttle position causes the coupled cable 200 or shaft 202 coupled to the one of the throttles 92 to move in response. The movement of this coupled cable 200 or shaft 202 in turn, causes each of the additional respective cables 200 or shafts 202 to move in a like manner, with the movement facilitated by the u-joints 220 located at the transitions, thereby resulting in the other one of the throttles 92 rotating in a coordinated manner with the first one of the throttles 92 in either the first or second direction to the same driving throttle position.

Referring next to FIG. 14D, in another embodiment, as opposed to utilizing u-joints 200 to transition between the respective pairs of mechanical cables 200 or shafts 202, gear assemblies 230 are utilized. Each gear assemble 230 comprises multiple gears and are positioned between each respective pair of the cables 200 or shafts 202 at locations extending between the handles 52 to transition movement from one throttle 92 to another in the same manner as described for FIG. 14C. Other forms of couplings (besides u-joints and gear assemblies) to transfer motion between the cables, shafts, or other links are also contemplated.

In some embodiments, the throttles 92 are linked more directly. Two exemplary embodiments are provided below in FIGS. 15 and 16. Referring first to FIG. 15, a hollow center shaft 250 is coupled to and extends between each of the pair of handles 52 in a manner that does not affect the operation of the respective throttles 92. A mechanical cable 200, shaft 202 (or other link), is coupled to and between each of the respective throttles 92, with the mechanical cable 200 or shaft 202 extending within the interior of the hollow center shaft 250. A vertically extending support 252 is coupled to the hollow center shaft 250 and to the intermediate frame 26, thereby fixedly securing the hollow center shaft 250 to each of the pair of handles 52 and to the intermediate frame 26. In other versions, the support 252 is absent. The rotation of one of the throttles 92 in the first direction 94 or second direction 96 by a user from the neutral position to the driving throttle position causes the coupled cable 200 or shaft 202 to move in response. The movement of the coupled cable 200 or shaft 202 in turn causes the other one of the throttles 92 to rotate in a coordinated manner in either the first or second direction to the same driving throttle position. In another embodiment, as shown in FIG. 16, a lower hollow shaft 260 and transverse hollow shafts 262 are coupled to and extend between each of the pair of handles 52 in a manner that does not affect the operation of the respective throttles 92. The transverse hollow shafts 262 interconnect the handles 52 and the lower hollow shaft 260 at transition points 264. A mechanical cable 200 or shaft 202 (or other link) is coupled to and between each of the respective throttles 92, with the mechanical cable 200 or shaft 202 extending within the interior of the hollow shafts 260, 262. In certain embodiments, the hollow shafts 260, 262 may be coupled to the intermediate frame 26, thereby fixedly securing the hollow shafts 260, 262 to each of the pair of handles 52 and to the intermediate frame 26. Alternatively, the hollow shafts 260, 262 are positioned adjacent to the intermediate frame 26 without being physically connected to the intermediate frame 26. The rotation of one of the throttles 92 in the first direction 94 or second direction 96 by a user from the neutral position to the driving throttle position causes the coupled cable 200 or shaft 202 to move in response. The movement of the coupled cable 200 or shaft 202 in turn causes the other one of the throttles 92 to rotate in a coordinated manner in either the first or second direction to the same driving throttle position. While the shape of the coupled hollow shafts 260, 262 between the pair of throttles 92 in FIG. 16 resemble a generally U-shape as shown, other couplings of the hollow shafts 260, 262 between the throttles 92 are envisioned and are not limited to the configuration illustrated. Still further, additional lower hollow shafts 260 and/or transverse hollow shafts 262 may be included which modify the overall shape of the coupling between the respective pair of throttles 92.

While not illustrated, the embodiment of FIG. 16 may also include u-joints (such as those described above in FIG. 14C), or gear assemblies (such as those described above in FIG. 14D) located at the transition points 264. Accordingly, in these alternative embodiments, multiple mechanical cables 200 of shafts 202 may be coupled to each other using the respective u-joints or gear assemblies (or other couplings), and the rotation of one of the pair of throttles 92 results in the corresponding coordinated rotation of the other of the throttles 92.

Figure 17:
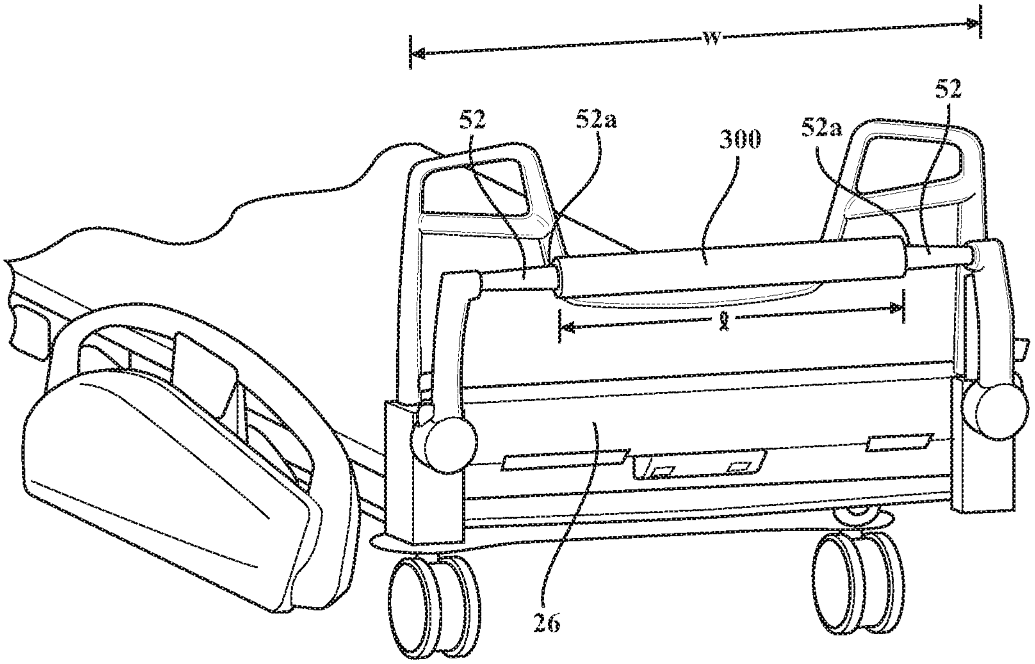
FIG. 17 is a perspective view of a pair of handles and a single throttle of another embodiment of the patient transport apparatus.

In yet another alternative embodiment, as illustrated in FIG. 17, instead of utilizing two or more respective throttles 92 to facilitate the movement of the patient transport apparatus 20, a single rotatable throttle 300 may replace the two or more respective throttles 92 on the patient transport apparatus 20. The single rotatable throttle 300 is coupled to and extends between the pair of handles 52 from a first throttle end 52*a* to a second throttle end 52*a*. The rotatable throttle 300 has a length (l) extending in the direction between the pair of handles 52. In these embodiments, the length (l) should be sufficiently long to allow a user to rotate the throttle 300 from a position corresponding the right side 39 or the left side 41 of the patient transport apparatus 20. In certain embodiments, the length (l) of the rotatable throttle 300 is greater than half of a width (w) of the support structure 22 of the patient transport apparatus 20 defined between the right side 39 and the left side 41 of the patient transport apparatus 20. In some embodiments, the single rotatable throttle 300 is sized so that it is accessible from either the right side 39 or the left side 41 by virtue of being located at a distance of less than 20, 15, 10, or 5 inches from the right side 39 and the left side 41.

Figure 18:
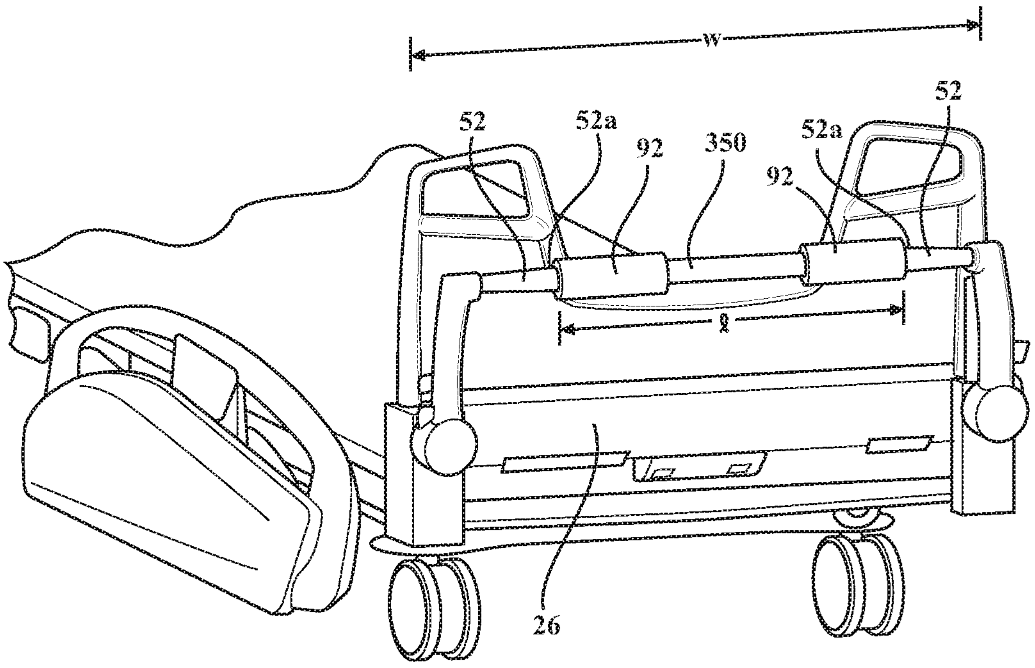
FIG. 18 is a perspective view of a pair of handles and throttles of yet another embodiment of the patient transport apparatus.

In yet another embodiment, as shown in FIG. 18, a center shaft 350 is coupled to and extends between the pair of throttles 92 without the use of a vertical support. In certain embodiments, the center shaft 350 is hollow and includes either the mechanical cables 200 or shafts 202 as described above, to coordinate the rotation of the pair of throttles 92 in the manner described above with respect to FIGS. 15 and 16. In other embodiments, the center shaft 350 is solid and is coupled to the ends of the throttles 92 such that the rotation of one of the throttles 92 rotates the center shaft 350 and the other of the pair of throttles in a coordinated manner.

In each of the embodiments of FIG. 15-18, the cross-sectional shape of the respective center shaft 250, 350, lower hollow shaft 260 and/or transverse hollow shafts 262 may be substantially circular as shown, or alternatively may take on any other relative regular or irregular cross-sectional design, such as being oval-shaped, squared, triangulated or the like. Further, the cross-sectional dimensions of the shafts on a single apparatus 20 may vary at different locations. By way of one non-limiting example, the lower hollow shaft 260 may have a circular cross-section having a different diameter than the circular cross-section of the transverse hollow shaft 252.

Figure 19:
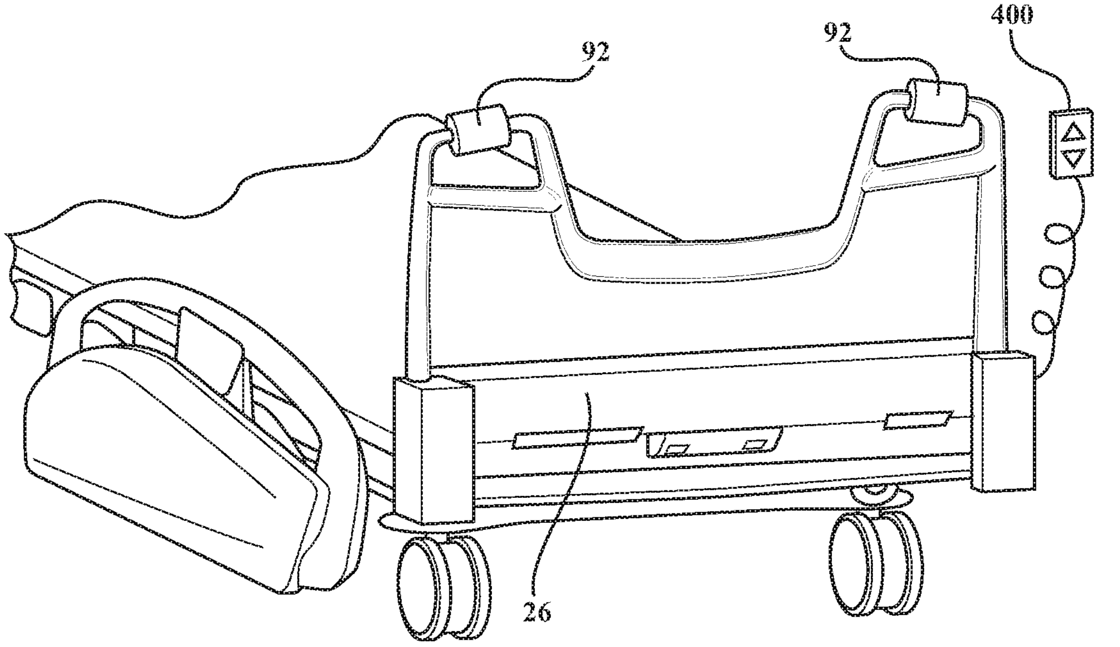
FIG. 19 is a perspective view of a pair of handles and throttles of yet another embodiment of the patient transport apparatus.

In yet another embodiment, as shown in FIG. 19, the pair of throttles 92 are rotatably coupled to the footboard 48, but may additionally, or alternatively, be rotatably coupled to the headboard 46, to any of the side rails 38, 40, 42, 44, and/or at any other suitable location. Another user input device in the form of a pendant control 400 coupled to the controller 126 may additionally, or alternatively, be employed to control operation of the drive wheel assembly 62. The pendant control 400 may comprise user-selectable buttons, sensors, etc. to control a speed and/or direction of the drive wheel assembly 62. The sensors may comprise capacitive touch sensors, piezoelectric elements, load cells, or the like. Separate buttons/sensors on the pendant control 400 may be associated with forward and/or reverse directions, slow, medium, and/or fast speeds, and/or any combination thereof. Any suitable user input devices may be employed to enable the user to control speed and/or direction of movement. The pendant control 400 may be wired or wirelessly connected to the controller 126 and/or may be dockable on a component (e.g., a side rail) of the patient transport apparatus 20.

Figure 20:
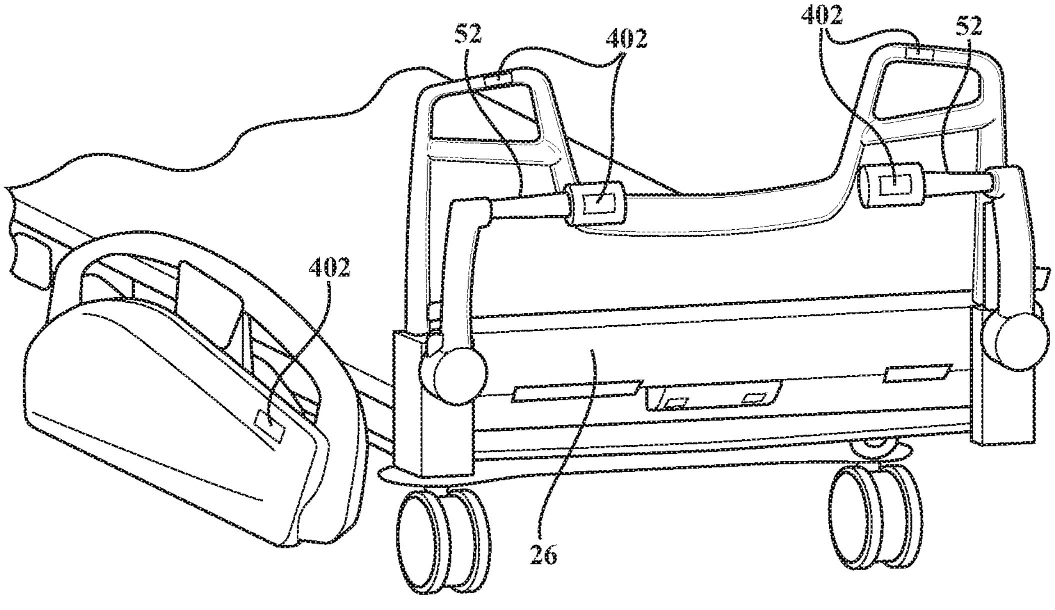
FIG. 20 is a perspective view of a pair of handles and push button controls of yet another embodiment of the patient transport apparatus.

In yet another embodiment, as shown in FIG. 20, user input devices 402, in the form of user-selectable buttons, sensors, or the like, may be placed at one or more locations about the patient transport apparatus 20 to control a speed and/or direction of the drive wheel assembly 62. The user input devices 402 may be located on one or more of the side rails 38, 40, 42, 44, headboard 46, footboard, 48, handles 52, and/or any other suitable location. The user input devices 402 may be located so that the user's hand may be located on a grip area or handle to allow maneuvering of the patient transport apparatus 20, while using one or more fingers to actuate the user input devices 402 to provide input. The sensors may comprise capacitive touch sensors, piezoelectric elements, load cells, or the like. Separate user input devices may be associated with forward and/or reverse directions, slow, medium, and/or fast speeds, and/or any combination thereof. Any suitable user input devices may be employed to enable the user to control speed and/or direction of movement. In some cases, by placing the user input devices 402 along a side of the patient transport apparatus 20, users can direct movement while being located along the side of the patient transport apparatus 20, instead of being located at either the foot end or head end.

Figure 21:
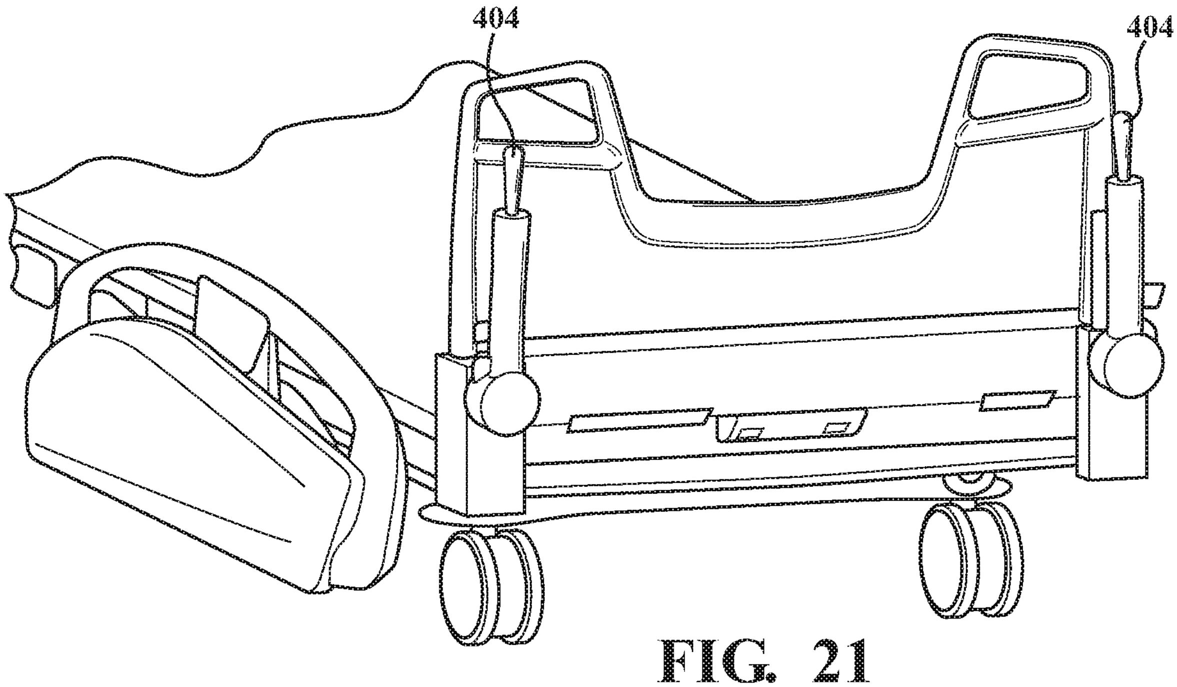
FIG. 21 is a perspective view of a pair of joystick controls of yet another embodiment of the patient transport apparatus.

In yet another embodiment, as shown in FIG. 21, user input devices 404, in the form of a joystick control, may be placed at one or more locations about the patient transport apparatus 20 to control a speed and/or direction of the drive wheel assembly 62. The user input devices 404 may be located on one or more of the side rails 38, 40, 42, 44, headboard 46, footboard, 48, corner posts (as shown), and/or any other suitable location. The joystick control may employ position sensing (e.g., potentiometer, encoders, hall-sensors, or the like) to detect a position of a joystick handle relative to its base. The joystick control may control the drive wheel assembly 62 to move in forward and/or reverse directions, to move at slow, medium, and/or fast speeds, and/or any combination thereof. In some cases, by placing the user input devices 404 near a side of the patient transport apparatus 20, users can direct movement while being located along the side of the patient transport apparatus 20, instead of being located at either the foot end or head end.

In still further embodiments (not shown), the handles 52 and associated throttles 92 may be moved from their operational position to a stowed position when not in use. In certain embodiments, the handles 52 are pivoted downward, with the pivot point corresponding to the location wherein the handles 52 are coupled to the intermediate frame 26. Still further, in certain embodiments, the handles 52 may be pivoted about this pivot point inwardly towards one another. In still other embodiments, the handles 52 may be telescoped downward within the intermediate frame 26. In still further embodiments in which the handles 52 are attached in a 4-bar linkage configuration, such as in FIG. 16, the handles 52 may be pivoted about pivot points P to a stowed configuration (shown in phantom in FIG. 16). Other methods of stowing the handles 52 and throttles 92 are also contemplated.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus comprising:
a support structure;
a drive wheel assembly comprising:
a drive wheel; and
a powered drive system coupled to said drive wheel;
a pair of handles each operatively attached to an opposing lateral side of said support structure and extending towards each other;
at least two user input devices, each of said at least two user input devices being selectable for operation by a user to cause said powered drive system to rotate said drive wheel, with two of said at least two user input devices comprising a pair of rotatable throttles each being coupled to a respective one of said pair of handles and being arranged for respective rotation in a first direction and in a second direction opposite to said first direction;
a pair of touch sensors each operatively attached to a respective one of said pair of handles adjacent to a respective one of said pair of rotatable throttles to sense user engagement;
a pair of visual indicators each coupled to a respective one of said pair of handles and associated with a respective one of said at least two user input devices; and
a controller coupled to said powered drive system, said pair of touch sensors, said pair of visual indicators, and said at least two user input devices, with said controller configured to:
determine which one of said at least two user input devices is selected by the user as an active user input device operable to cause said powered drive system to rotate said drive wheel based on initial user engagement being sensed by one of said pair of touch sensors,
maintain the other of said at least two user input devices as an inactive user input device,
activate said visual indicator associated with said active user input device coupled to one of said pair of handles to differentiate said active user input device from said inactive user input device coupled to the other of said pair of handles,
operate said powered drive system to rotate said drive wheel to propel said patient transport apparatus in a forward direction in response to rotation of said rotatable throttle of said active user input device in said first direction, and
operate said powered drive system to rotate said drive wheel to propel said patient transport apparatus in a backward direction in response to rotation of said rotatable throttle of said active user input device in said second direction.

2. The patient transport apparatus of claim 1, wherein said pair of touch sensors are each coupled to a respective one of said pair of rotatable throttles.

3. The patient transport apparatus of claim 1, wherein said pair of touch sensors are each coupled to a respective one of said pair of handles.

4. The patient transport apparatus of claim 1, wherein each of said pair of rotatable throttles are rotatable from a respective neutral throttle position:

in said first direction for propelling said patient transport apparatus in said forward direction, and in said second direction for propelling said patient transport apparatus in said backward direction.

5. The patient transport apparatus of claim 4, wherein said controller is further configured to adjust a drive speed of said drive wheel based on a detected throttle position of said rotatable throttle of said active user input device.

6. The patient transport apparatus of claim 5, wherein said drive speed is proportional to a measured angle of said rotatable throttle of said active user input device from said neutral throttle position.

7. The patient transport apparatus of claim 4, wherein said controller is further configured to deactivate each of said at least two user input devices in response to said rotatable throttle of said active user input device returning to said neutral throttle position concurrent with an absence of user engagement with said touch sensor initially engaged by the user.

8. The patient transport apparatus of claim 1, wherein said controller is further configured to deactivate each of said at least two user input devices in response to an absence of user engagement with either of said pair of touch sensors persisting for a predetermined period.

* * * * *